US010149057B2

(12) United States Patent
Suyama et al.

(10) Patent No.: US 10,149,057 B2
(45) Date of Patent: Dec. 4, 2018

(54) AUDIO DEVICE, CONTROL TERMINAL, METHOD FOR AUDIO DEVICE, AND METHOD FOR CONTROL TERMINAL

(71) Applicant: YAMAHA CORPORATION, Hamamatsu-shi (JP)

(72) Inventors: Akihiko Suyama, Hamamatsu (JP); Kazuya Mushikabe, Hamamatsu (JP); Futoshi Muronaga, Hamamatsu (JP); Tomoyoshi Akutagawa, Hamamatsu (JP); Keisuke Tsukada, Hamamatsu (JP)

(73) Assignee: YAMAHA CORPORATION, Hamamatsu-Shi (JP)

( * ) Notice: Subject to any disclaimer, the term of this patent is extended or adjusted under 35 U.S.C. 154(b) by 0 days.

(21) Appl. No.: 15/839,904

(22) Filed: Dec. 13, 2017

(65) Prior Publication Data

US 2018/0109876 A1 Apr. 19, 2018

Related U.S. Application Data

(63) Continuation of application No. PCT/JP2016/078710, filed on Sep. 28, 2016.

(30) Foreign Application Priority Data

Sep. 30, 2015 (JP) ................................ 2015-194507

(51) Int. Cl.
*H04R 3/12* (2006.01)
*H04M 11/00* (2006.01)
(Continued)

(52) U.S. Cl.
CPC ............... *H04R 3/12* (2013.01); *G06F 3/165* (2013.01); *H04M 11/00* (2013.01); *H04Q 9/00* (2013.01);
(Continued)

(58) Field of Classification Search
CPC .......... G06F 3/165; H04R 27/00; H04R 3/12; H04R 2227/005; H04R 2420/07; H04R 2227/003; H04M 11/00; H04Q 9/00
(Continued)

(56) References Cited

U.S. PATENT DOCUMENTS 8,745,285 B2 6/2014 Eguchi et al.
9,247,363 B2 1/2016 Triplett et al.
(Continued)

FOREIGN PATENT DOCUMENTS

JP 2013251594 A 12/2013
JP 5501444 B2 5/2014
(Continued)

OTHER PUBLICATIONS

International Search Report issued in Intl. Appln. No. PCT/JP2016/078710 dated Dec. 13, 2016. English translation provided.
(Continued)

*Primary Examiner* — Melur Ramakrishnaiah
(74) *Attorney, Agent, or Firm* — Rossi, Kimms & McDowell LLP

(57) ABSTRACT

An audio device includes: at least one processor, and at least one memory configured to store instructions that, when executed by the at least one processor, causes the audio device to: transmit a first device name relating a group to which the audio device belongs to in a case where the audio device is set as a master device, wherein the master device serves as a content supply source for another device that belongs to the group, and transmit a second device name relating to the audio device in a case where the audio device is not set as the master device.

18 Claims, 13 Drawing Sheets

(51) Int. Cl.
*H04Q 9/00* (2006.01)
*G06F 3/16* (2006.01)
*H04R 27/00* (2006.01)

(52) U.S. Cl.
CPC ....... *H04R 27/00* (2013.01); *H04R 2227/003* (2013.01); *H04R 2227/005* (2013.01); *H04R 2420/07* (2013.01)

(58) Field of Classification Search
USPC ..... 700/94; 381/80, 82, 303, 56, 59, 107, 77
See application file for complete search history.

(56) References Cited

U.S. PATENT DOCUMENTS

| | | | | |
|---|---|---|---|---|
| 2015/0113564 | A1 | 4/2015 | Mushikabe | |
| 2015/0286360 | A1* | 10/2015 | Wachter .................... | G06F 3/14 345/173 |
| 2015/0331663 | A1* | 11/2015 | Beckhardt ............... | G06F 3/165 700/94 |
| 2015/0371681 | A1* | 12/2015 | Coburn, IV ............ | G06F 3/165 700/94 |
| 2016/0291925 | A1 | 10/2016 | Kohara et al. | |

FOREIGN PATENT DOCUMENTS

| | | | |
|---|---|---|---|
| JP | 2015100085 | A | 5/2015 |
| WO | 2014172417 | A1 | 10/2014 |

OTHER PUBLICATIONS

Written Opinion issued in Intl. Appln. No. PCT/JP2016/078710 dated Dec. 13, 2016.

* cited by examiner 1
3
AP
32
WIRELESS LAN COMMUNICATION CIRCUIT
33
3G/4G COMMUNICATION CIRCUIT
34
Bluetooth COMMUNICATION CIRCUIT
26
31
MEDIA I/F
15
MEMORY CARD
70
71
20
21
CPU
22
ROM
23
RAM
24
IMAGE PROCESSOR
25
VOICE PROCESSOR
40
VRAM
41
DISPLAY UNIT
42
AMPLIFIER
16
SPEAKER
30
MANIPULATION UNIT

*FIG. 4*

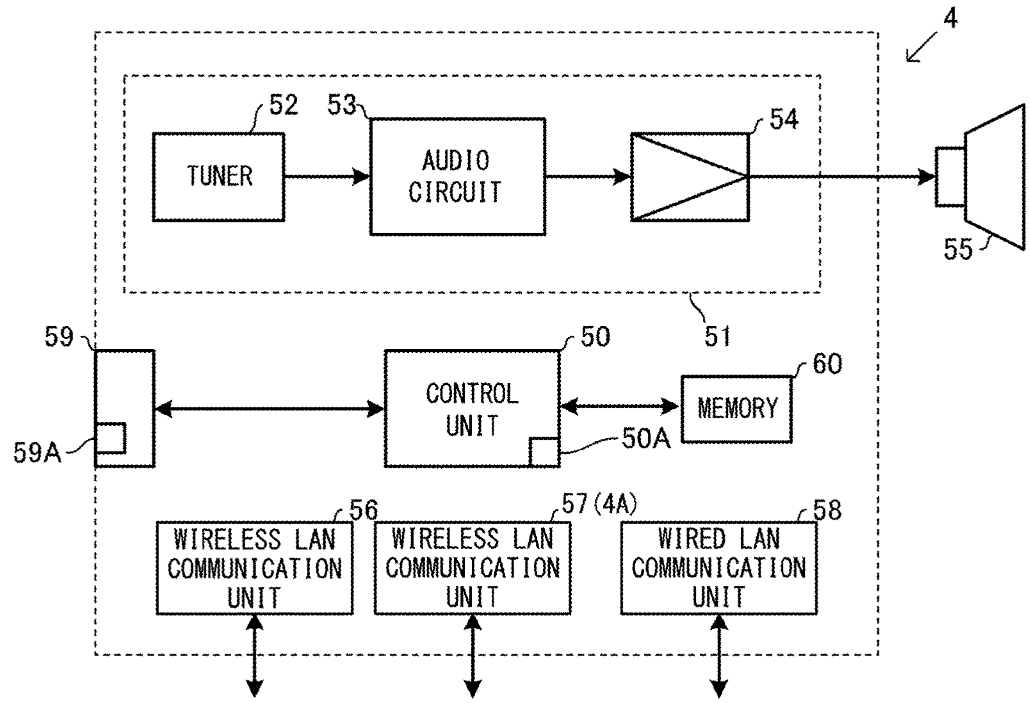

*FIG. 5*

| SYSTEM ID=01 | DEVICE ID | MAC ADDRESS | IP Address | HOP No. | AP START | Child No. |
|---|---|---|---|---|---|---|
| | 00 | xx-xx-xx-xx-xx-xx<br>yy-yy-yy-yy-yy-yy | 192.168.0.1<br>192.168.1.1 | 0 (ROOT) | YES | 2 |
| | 01 | xx-xx-xx-xx-xx-xx<br>yy-yy-yy-yy-yy-yy | 192.168.0.2<br>192.168.1.2 | 1 (NODE) | YES | 1 |
| | 02 | xx-xx-xx-xx-xx-xx<br>yy-yy-yy-yy-yy-yy | 192.168.0.3<br>192.168.1.3 | 1 (NODE) | NO | 1 |
| | 03 | xx-xx-xx-xx-xx-xx<br>yy-yy-yy-yy-yy-yy | 192.168.0.4<br>192.168.1.4 | 2 (LEAF) | NO | 0 |
| | | | | | | |
| | 06 | xx-xx-xx-xx-xx-xx<br>yy-yy-yy-yy-yy-yy | 192.168.0.6<br>192.168.1.6 | 99 (BRANCH) | NO | 0 |
| | EXTERNAL ACCESS POINT INFORMATION | SSID | pass pharase | Security type | BSSID | |

FIG. 6

| | DEVICE ID | IP Address | TYPE | INSTALLATION LOCATION (ROOM ID) | GROUP | SERVICE | VARIOUS SETTING INFORMATION |
|---|---|---|---|---|---|---|---|
| SYSTEM ID=01 | 00 | 192.168.0.1 | AV RECEIVER | Living room | 1A | Net Radio, Net distribution | *** |
| | 01 | 192.168.0.2 | PLAYER | Dining room | 1B | CD, Net distribution, Radio | *** |
| | 02 | 192.168.0.3 | PLAYER | Bedroom | 1B | CD, Net distribution, Radio | *** |
| | 03 | 192.168.0.4 | SPEAKER | Kitchen | – | Net distribution, Radio | *** |
| | | | | | | | |
| | 06 | 192.168.0.6 | SPEAKER | Room B | – | *** | *** |

FIG. 7

| ROOM ID | ROOM NAME | BACKGROUND IMAGE |
|---|---|---|
| A1 | Office | XXXX.jpg |
| A2 | Dining room | XXXX.jpg |
| A3 | Bedroom | XXXX.jpg |
| A4 | Living room | XXXX.jpg |
| A5 | Kitchen | XXXX.jpg |
| A6 | Room A | XXXX.jpg |

AUDIO DEVICE, CONTROL TERMINAL, METHOD FOR AUDIO DEVICE, AND METHOD FOR CONTROL TERMINAL

CROSS-REFERENCE TO RELATED APPLICATIONS

The present application is a continuation application of International Application No. PCT/JP2016/078710, filed Sep. 28, 2016, which claims priority to Japanese Patent Application No. 2015-194507, filed Sep. 30, 2015. The contents of these applications are incorporated herein by reference.

BACKGROUND OF THE INVENTION

Field of the Invention

The present invention relates to an audio system that synchronously plays back the same content by a group including two or more audio devices.

Description of Related Art

In audio systems in recent years, a plurality of audio devices (playback devices) installed in rooms (areas) such as a living room and a bedroom are connected to a network (in particular, a wireless network), and content playback and the like of each device are controlled by a portable terminal (for example, refer to Japanese Unexamined Patent Application Publication No. 2013-251594). By starting a dedicated application program, the portable terminal controls the system.

For example, a user, while viewing the screen of a portable terminal, can manipulate a touch panel thereof to select one audio device and can instruct the selected audio device to perform playback or the like. In this case, if the selected one audio device belongs to the group, by instructing the selected audio device to perform playback, synchronous playback is performed by the plurality of audio devices belonging to the group.

The above-mentioned audio device is compatible not only with a dedicated application program for an audio system but also with instructions from a portable terminal that executes an application program of a music distribution service via the network. The application program of the music distribution service causes the portable terminal to function as a controller for causing an audio device to play back contents in a distribution server. The portable terminal that executes the application program of this music distribution service does not have functions for performing a name change of the audio device and settings of the aforementioned group, but is able to perform general instructions to an audio device related to playback of content in a distribution server such as play/stop and volume adjustment. In this case as well, synchronous playback is performed when the portable terminal selects an audio device belonging to a group and gives a playback instruction.

In a portable terminal that executes the application program of the music distribution service mentioned above, information related to the group is not included as information of the audio device displayed on the screen, so it has been difficult for the user to ascertain whether playback is being performed only by the selected audio device or whether synchronous playback is being performed by the group.

SUMMARY OF THE INVENTION

One exemplary object of the present invention is to enable transmission of the selected device name in accordance with a group setting situation.

An audio device according to an aspect of the present invention includes at least one processor, and at least one memory configured to store instructions that, when executed by the at least one processor, causes the audio device to: transmit a first device name relating a group to which the audio device belongs to in a case where the audio device is set as a master device, wherein the master device serves as a content supply source for another device that belongs to the group, and transmit a second device name relating to the audio device in a case where the audio device is not set as the master device.

A control terminal according to an aspect of the present invention includes: at least one processor, and at least one memory configured to store instructions that, when executed by the at least one processor, causes the control terminal to: receive a manipulation for setting a plurality of audio devices including a first audio device to a same group and a manipulation for cancelling the setting of the group, transmit a setting request to the first audio device in a case where the manipulation for setting the plurality of audio devices to the same group has been received, wherein the setting request is one of a request to change a device name of the first audio device to a first device name relating to the group to which the first audio device belongs, and a request to add the first device name as the device name of the first audio device, and transmit a cancellation request to the first audio device in a case where the manipulation for cancelling the setting of the group has been received, wherein the cancellation request is one of a request to change the device name of the first audio device to a second device name relating to the first audio device, and a request to delete the first device name from the device name of the first audio device.

A method for an audio device according to an aspect of the present invention includes: transmitting a first device name relating a group to which the audio device belongs to in a case where the audio device is set as a master device, the master device serving as a content supply source for another device that belongs to the group; and transmitting a second device name relating to the audio device in a case where the audio device is not set as the master device.

An embodiment of this invention enables the transmission of a selected device name in accordance with the setting situation of a group.

BRIEF DESCRIPTION OF THE DRAWINGS

FIG. 4 is a block diagram of an audio device to which the embodiment of this invention is applied.

FIG. 5 is a diagram that shows an example of a system management table that is set in a host device and the controller in the embodiment of this invention.

FIG. 6 is a diagram that shows an example of the audio control table that is set in the controller in the embodiment of this invention.

FIG. 7 is a diagram that shows an example of the room table that is set in the controller in the embodiment of this invention.

EMBODIMENTS FOR CARRYING OUT THE INVENTION

An object of an embodiment of the present invention is to be able to change the display of a device name of an audio device in accordance with the setting situation of a synchronous playback group.

Figure 1:
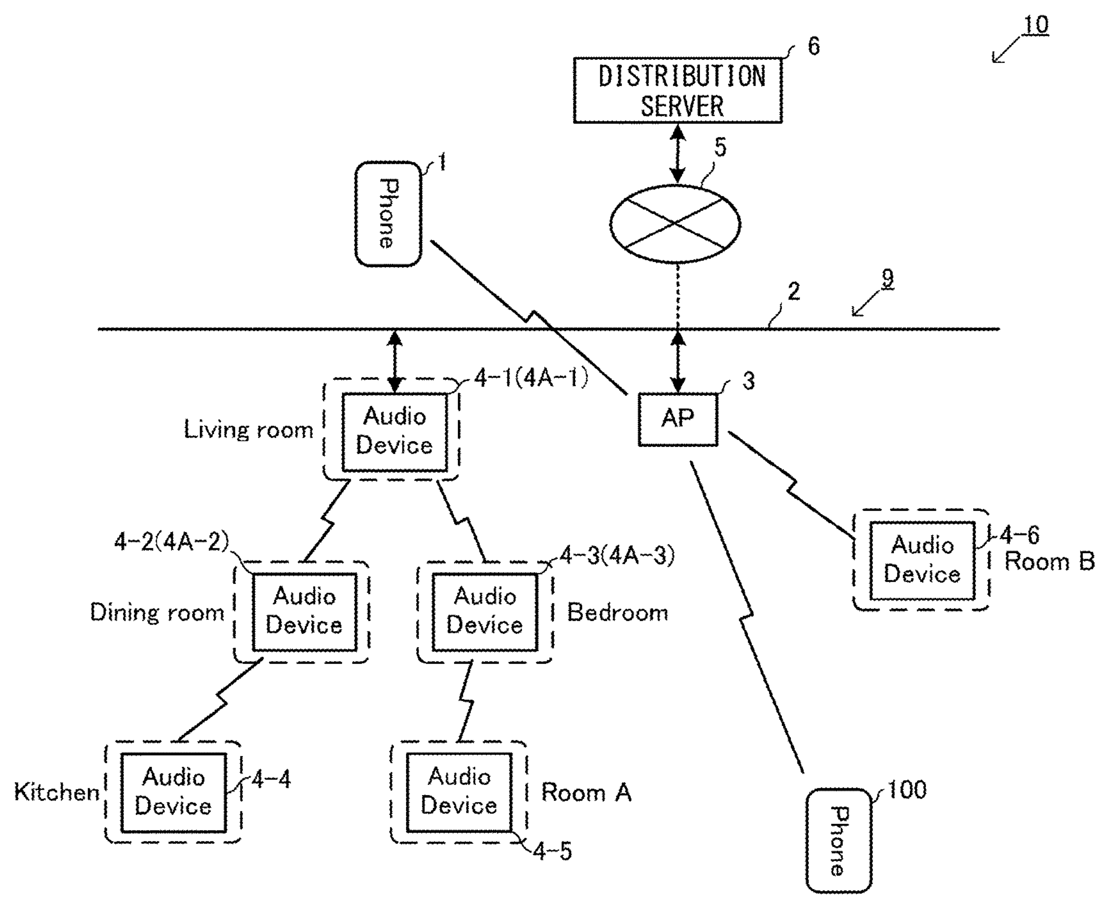
FIG. 1 is a configuration diagram of an audio system to which an embodiment of this invention is applied.

FIG. 1 is a diagram that shows the constitution of the audio system 10 to which the embodiment of the present invention is applied. The audio system 10 includes a plurality of audio devices 4 (4-1 to 4-6) connected by a network 9 including a wired LAN 2 and an access point (AP, external access point) 3, and a multifunctional mobile phone (portable terminal) 1 that functions as a controller. Hereinbelow, the mobile phone 1 is also referred to as an audio system controller 1 or a controller 1. Each audio device 4 mutually transmits and receives audio signals via the network 9. The controller 1 transmits a command message to the audio devices 4 via the network 9.

Each audio device 4 (hereinbelow also called a component device) that constitutes the audio system 10 has a wired LAN function and two wireless LAN functions. The audio device 4 can start an access point using one of the two wireless LAN functions. The access point started by the audio device 4 is called an internal access point 4A. A lower audio device 4 is connected to the internal access point 4A. The internal access point 4A normally operates in stealth mode (other than during initial connection described below), and so its existence is hardly known to other devices. The other wireless LAN function functions as a wireless LAN slave, and is connected to the internal access point 4A of an upper audio device 4 or an external access point 3.

An access point (external access point) 3 is connected to the wired LAN 2. The audio device 4-1 is connected by a cable to the wired LAN 2. The audio devices 4-2, 4-3 are connected by the wireless LAN to the internal access point 4A-1 of the upper audio device 4-1. The audio device 4-4 is connected by the wireless LAN to the internal access point 4A-2 of the upper audio device 4-2. The audio device 4-5 is connected by the wireless LAN to the internal access point 4A-3 of the upper audio device 4-3. The audio device 4-6 is connected to the external access point 3.

In this embodiment, the network 9 is constituted by the wired LAN 2 and the wireless LAN including the external access point 3 and the internal access point 4A. As the wired LAN 2, for example Ethernet (IEEE 802.3) may be used, and as the wireless LAN, Wi-Fi (IEEE 802.11g) may be used. A distribution server 6 is connected to the network 9 via a gateway (not illustrated) from the wired LAN 2 and the Internet 5. The distribution server 6 distributes music data to the audio device 4.

Each audio device 4 is called a root device, a node device, a leaf device, or a branch device in accordance with the mode of connection to the wired LAN 2. A root device is the uppermost device connected directly (by cable) to the wired LAN 2. The audio device 4-1 in FIG. 1 is a root device. A root device is an audio device that is initially registered during construction of the audio system 10, and is the base point of the audio system 10. The root device starts an internal access point 4A for connecting a lower audio device 4 to a network to allow the device to join the audio system 10. All music information to be played back by the audio device 4 connected to the root device or below (node devices, leaf devices) is transmitted via the internal access point 4A of the root device.

A node device is an intermediate device connected to the root device (the internal access point 4A of the root device) by the wireless LAN. In FIG. 1, the audio devices 4-2 and 4-3 are node devices. A node device starts an internal access point 4A for connecting a lower audio device 4 to the network to allow the device to join the audio system 10. The music information played back by the audio device 4 that is connected to a node device or lower (leaf device) is transmitted via the internal access point 4A of the node device.

A leaf device is a lower device that is connected to a node device (an internal access point of a node device) by a wireless LAN. In FIG. 1, the audio devices 4-4 and 4-5 are leaf devices. A leaf device does not start an internal access point 4A, but may be made to start one.

A branch device is an audio device 4 that is connected by a wireless LAN to the external access point 3 separate from the tree having the root device as a vertex, and communicates with another audio device 4 in the audio system 10 via the wired LAN 2. In FIG. 1, the audio device 4-6 is a branch device. The branch device does not start an internal access point 4A, but may be made to start one.

In this audio system 10, connections of up to two node devices are allowed to a root device for the sake of transmission of a high-quality audio signal. Also, connections of up to two leaf devices are permitted to each node device. Also, the connection hierarchy using the internal access point 4A is up to the three levels "root device—node device—leaf device". Accordingly, with a wireless LAN tree having a root device as its vertex, it is possible to connect up to seven audio devices including the root device. In the tree shown in FIG. 1, five audio devices 4 (4-1 to 4-5) are connected. There is no limit to the number of branch devices. However, with regard to controlled objects of the controller 1, the number of audio devices 4 in the entire audio system 10 is limited to 10. However, in the embodiment of the present invention, the number of tree levels and the maximum number of lower devices that can be connected to each audio device 4 are not limited.

As shown in FIG. 1, the audio devices 4-1 to 4-6 are respectively arranged in the rooms (areas), namely, the living room, dining room, bedroom, kitchen, room A, and room B in a residence.

Each audio device 4-1 to 4-6 of the audio system 10 can each independently play back separate content. In the audio system 10, the plurality of audio devices 4 can be grouped. In the grouped plurality of audio devices 4, content supplied from the same audio source is synchronously played back. The content is for example a musical piece. An audio source includes media such as a CD or hard disk that each audio device 4-1 to 4-6 is equipped with, and a music distribution service by a distribution server 6. The file types of the music data include for example MP3, WAV, SoundVQ, WMA, AAC, and the like.

The mobile phone 1 functions as an audio system controller (hereinbelow a controller) 1 by an audio system control program 70 (refer to FIG. 2) being started. The mobile phone 1 (controller 1) communicates with each audio device 4 belonging to the audio system 10 via the network 9. The controller 1 performs integrated control of the audio sources played back by each audio device 4-1 to 4-6 of the audio system 10 (for example, which musical piece to play on which audio device, which musical piece to distribute to which audio device 4, and the like) and the volume thereof. Also, each audio device 4 communicates with other audio devices 4 via the network 9, and mutually sends and receives audio signals.

The audio system control program 70 is an application program for the audio system 10. The audio system control program 70 causes the mobile phone 1 to actualize a function for constructing an audio system 10 and a setting function of the group that performs synchronous playback of the audio devices 4 belonging to the audio system 10, in addition to general command functions such as playback to the audio devices 4. Functions of constructing the audio system 10 include the controller 1, when a new audio device 4 has been added to the audio system 10, performing an update that adds this audio device 4. Details are described below.

The mobile phone 1 functions as a controller that controls other functions with respect to the audio devices 4 by starting other application programs. For example, the mobile phone 1 functions as a net distribution controller that performs musical piece selection in a music distribution service by the starting of a net distribution control program 170 (refer to FIG. 3). This embodiment shows an example that executes the distribution control program 170 with a separate mobile phone 100 from the mobile phone 1 in which the audio system control program 70 is executed. However, the audio system control program 70 and the distribution control program 170 may be started sequentially or in parallel on the same mobile phone 1. Hereinbelow, the mobile phone 100 is also called the net distribution controller 100 or the controller 100. The net distribution controller 100 also communicates with the audio devices 4 via the network 9.

The net distribution control program 170 is a program that realizes on the mobile phone 100 a command function for the playing back of musical pieces of the distribution server 6 by the audio devices 4, and causes the mobile phone 100 to function as a controller 100. Specifically, the net distribution controller 100, by communication, performs integrated control of content played back by the audio devices 4-1 to 4-6 (for example, playing back which musical piece of the distribution server 6 by which audio device 4) and the volume thereof.

Figure 2:
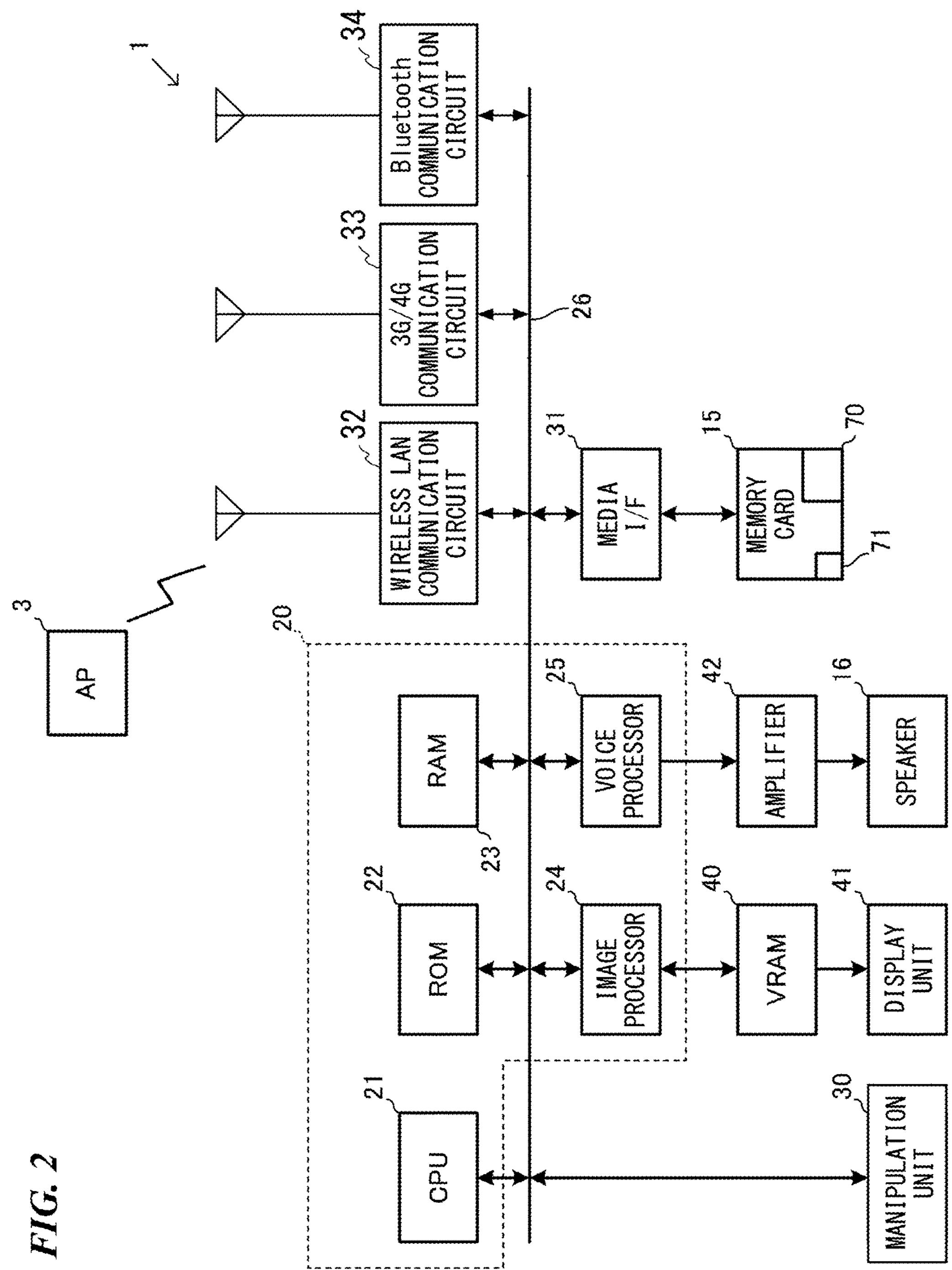
FIG. 2 is block diagram of a mobile phone to which the embodiment of this invention is applied and that functions as a controller.

Next, referring to the block diagram of FIG. 2, the configuration of the mobile phone 1 will be described. The mobile phone 1 is a multifunctional telephone that is known as a smartphone. The mobile phone 1 has a 3G/4G communication function, which uses mobile communication networks, has a wireless LAN (Wi-Fi) communication function, and has a Bluetooth communication function. The mobile phone 1 functions as a controller 1 by starting the audio system control program 70, which is an application program. The mobile phone 1 communicates with the audio device 4 of the audio system 10 via the network 9, and controls the audio system 10 by transmitting command messages according to user manipulations to the audio device 4.

The mobile phone 1 includes, on a bus 26, a control unit 20, a manipulation unit 30, a media interface 31, a Wi-Fi communication circuit 32, a 3G/4G communication circuit 33, and a Bluetooth communication unit 34. The control unit 20 includes a CPU 21, a ROM (flash memory) 22, a RAM 23, an image processor 24, and a voice processor 25. A video RAM (VRAM) 40 is connected to the image processor 24. A display unit 41 is connected to the VRAM 40. The display unit 41 includes a liquid crystal display. A standby screen, a telephone number, and the like are displayed in the display. When the mobile phone 1 functions as the controller 1, a screen for controlling the audio device 4 is displayed. An amplifier 42 including a D/A converter is connected to the voice processor 25. A speaker 16 is connected to the amplifier 42.

The image processor 24 includes a GPU (Graphics Processing Unit, graphics processing module) that generates various images, such as a standby window, telephone numbers, and the like. When the audio system control program 70 is started, the image processor 24 generates an image of an audio controller in accordance with instructions of the CPU 21, and expands this on the VRAM 40. The image expanded on the VRAM 40 is displayed on the display unit 41.

The voice processor 25 has a DSP (Digital Signal Processor) that encodes/decodes communication audio. The voice processor 25 outputs the decoded/generated audio to the amplifier 42. The amplifier 42 amplifies this audio signal and outputs it to the speaker 16.

The wireless LAN communication circuit 32 performs wireless communication using the IEEE 802.11g standard with the router 2, and communicates with the audio device 4 via the access points 3 and 7. The 3G/4G communication circuit 33 performs voice calls and data communication via a mobile telephone communication network. The Bluetooth communication unit 34 communicates with other Bluetooth compatible devices to perform transmission and reception of audio signals.

The manipulation unit 30 includes a touch panel 310 (refer to FIG. 12) formed on the display unit 41, and detects touch manipulations and flick manipulations on the touch panel 310. When the audio system control program 70 is started, a plurality of operators such as a setup button, scan button and the like are displayed in the display unit 41. The manipulation unit 30 detects a touch manipulation of the user and the coordinates thereof with the touch panel 310, and judges which operator has been manipulated.

A memory card 15 is connected to the media interface 31. The memory card 15 is, for example, a microSD card. The audio system control program 70 is stored in the memory card 15 or the ROM 22. In this embodiment, as shown in FIG. 2, the audio system control program 70 is stored in the memory card 15. The audio system control program 70 may be downloaded by 3G/4G or wireless LAN data communication, and may be stored in advance in the ROM 22 or the memory card 15. A storage area 71 for storing the constitution of the audio system is set in the memory card 15.

A basic program for executing a telephone call and application programs on this mobile phone 1 is stored in the ROM 22. The ROM 22 is a flash memory and it is also capable of storing downloaded application programs in addition to the basic program. The work area used when the CPU 20 executes the audio system control program 70 is set in the RAM 23.

Figure 3:
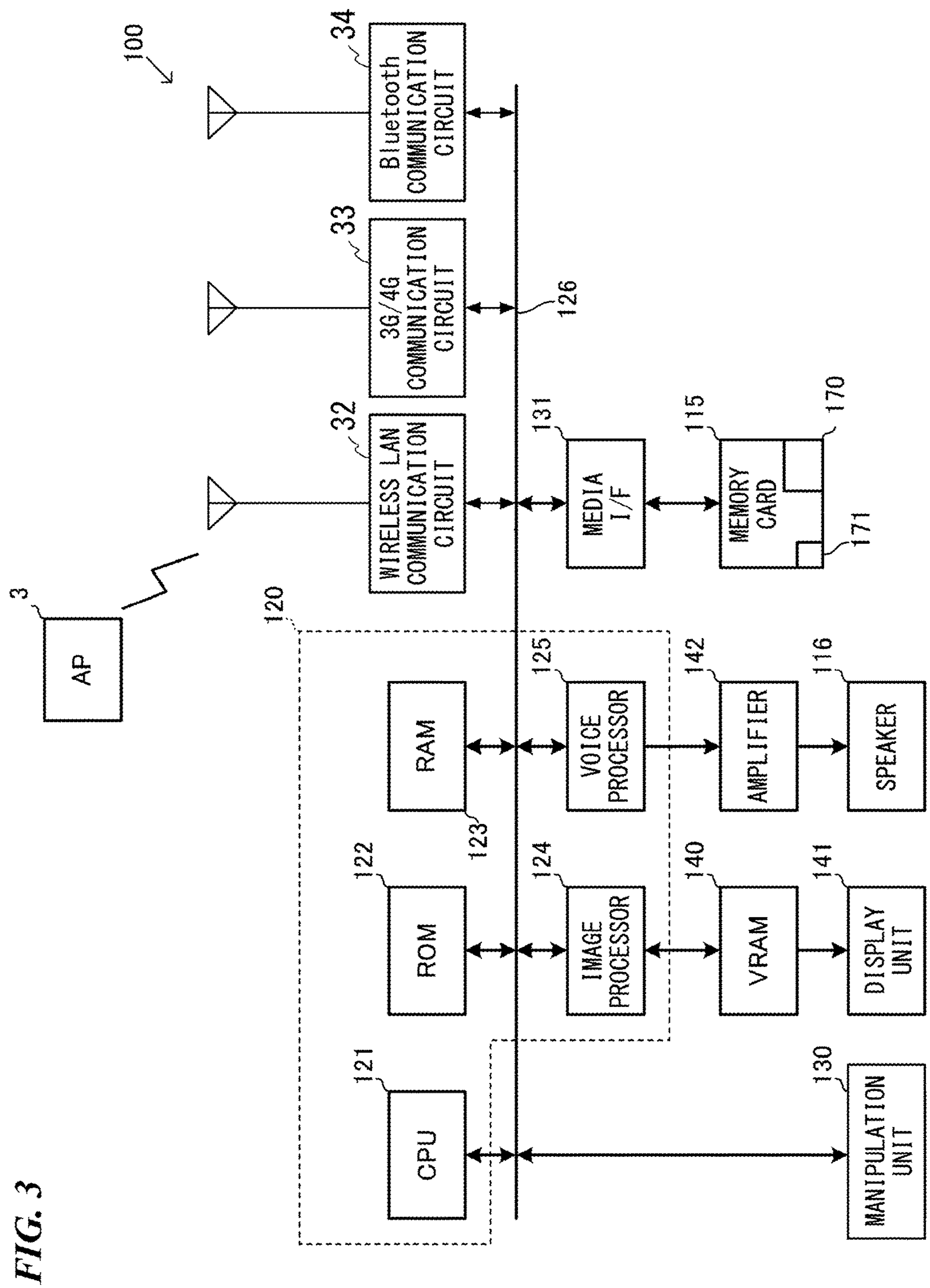
FIG. 3 is block diagram of a mobile phone to which the embodiment of this invention is applied and that functions as a controller.

Next, referring to the block diagram of FIG. 3, the constitution of the mobile phone 100 will be described. The mobile phone 100 is a multifunctional phone of the same constitution as the mobile phone 1. Accordingly, although a detailed description is omitted, the mobile phone 100 functions as the net distribution controller 100 by starting the net distribution control program 170. The mobile phone 100 communicates with the audio device 4 of the audio system 10 via the network 9, and transmits command messages in accordance with user manipulations, to thereby control the audio device 4 to play back musical pieces from the distribution server 6. A storage area 171 that stores information of the audio devices 4 capable of communication (IP address, device name, and the like) is set in the memory card 115. In order to simplify the explanation, the case has been described of the mobile phone 100 in which the net distribution control program 170 is started (the net distribution controller 100) and the mobile phone 1 in which the audio system control program 70 is started (the audio system controller 1) being separate mobile phones. However, the audio system controller 1 and the net distribution controller 100 may also be the same mobile phone. For example, when net distribution has been selected as the audio source of the audio device 4 by a manipulation of the audio system controller 1 by the user, the mobile phone 1 may automatically start the net distribution controller 100 to enable selection of net distribution content on the mobile phone 1.

Next, the constitution of the audio device 4 will be described referring to FIG. 4. The audio device 4 includes a control unit 50, an audio processing unit 51, a manipulation unit 59, and a memory 60. Moreover, the audio device 4 includes two wireless LAN communication units (RF modules) 56 and 57 and a wired LAN communication unit 58. The manipulation unit 59 has in addition to a volume operator (not illustrated), a connect button 59A. The control unit 50 includes a CPU and memory, and stores an audio system program 50A. The control unit 50 controls the operations of the audio processing unit 51 and the wireless LAN communication units 56 and 57, and the wired LAN communication unit 58 by the audio system program 50A. Thereby, the audio device 4 functions as a playback device for playing back content, and a synchronized playback controller that serves as a master that controls synchronized playback. The control unit 50, when the connect button 59A is pressed, executes an initial connection operation that is an operation for connecting this audio device 4 to the network 9. The initial connection operation is explained in detail below.

The one wireless LAN communication unit 56 among the two wireless LAN transmission units performs wireless communication with the external access point 3 or with the internal access point 4A of the upper audio device 4 in conformance with a wireless LAN standard such as IEEE 802.11g. The other wireless LAN communication unit 57 is started as an access point (internal access point 4A) and relays the other audio devices (for examples, audio devices 4-2, 4-3) to the wired LAN 2. The wireless LAN communication unit 57 is started as a temporary access point for initial connection also during initial connection of this audio device 4, and communicates with the controller 1 (mobile phone 1). The operation during initial connection is described below. The two wireless LAN communication units 56 and 57 may be achieved by having one hardware device operate in time-division mode. The wired LAN communication unit 58 has a cable connector and performs communication via the wired LAN 2 and the access point 3 in conformance with a communication standard such as IEEE 802.3 or the like. The controller (mobile phone) 1 is connected to the access point 3, and the control unit 50 communicates with the controller 1 via the network 9, sending operating states and receiving command messages.

The SSID (Service Set Identifier) and password of the internal access point 4A are character strings that can be derived from the MAC address of the wireless LAN communication unit 57. For example, a character string that expresses the MAC address in octets serves as the SSID, and the last three octets (model ID+serial number) may be the password. Thereby, an audio device that newly joins the audio system can discover the internal access point 4A on the basis of the SSID, that is, on the basis of the vendor ID and model ID of the MAC address, and can generate its own password to connect to the internal access point 4A. Thereby, it is possible to omit the input of the SSID and password by the user during connection to the internal access point 4A. The system of generating the SSID and password of the internal access point 4A is not limited to the aforementioned method.

The audio process unit 51 includes a tuner 52, an audio circuit 53, and a power amplifier 54. The tuner 52 receives audio signals from an FM broadcast or the Internet and inputs the signals to the audio circuit 53. The audio circuit 53 performs processing such as equalizing and volume adjustment on the input audio signal, and outputs the processed audio signal to the power amplifier 54. The power amplifier 54 amplifies the input audio signal and outputs the signal to the speaker 55 that is externally connected. The speaker 55 emits the input audio signal as sound. The memory 60 is for example EEPROM, and stores device information of the audio device 4 (device name, MAC address and/or IP address of the wireless LAN communication unit, installation location, and the like), and system information (system management table: refer to FIG. 5). Device names of a plurality of types are stored in the memory 60. The plurality of types of device names include the "device name" that is written when the device is shipped, the "room name" that is written when this audio device is registered in the audio system 10, and the "group name" that is written when this audio device becomes the master device of the group (details described below). "Room name" corresponds to the device name for a non-group of an embodiment of this invention. "Group name" corresponds to the device name for a group of an embodiment of this invention.

Although the audio devices 4-1 to 4-6 may be different devices from each other, the fundamental configuration of the communication functions and audio signal processing functions of these devices is the configuration shown in FIG. 4.

FIGS. 5 and 6 are diagrams showing examples of tables for managing the audio system 10. FIG. 5 shows the system management table (device list and AP list) for managing the connection topology of each audio device 4 in the network 9. FIG. 6 shows the audio control table for managing the operation of each audio device 4 in the audio system 10. The system management table is mainly used for management of network connections by the root device 4-1. The audio control table is mainly used for playback control of an audio source by controller 1.

The system management table stores the connection topology of each audio device 4 (component device) that constitutes the audio system 10. The system management table is created by the controller 1 at the time of construction of the audio system 10. When a new audio device 4 is added to the audio system 10, the controller 1 performs an update that adds this audio device 4 to the system management table. The system management table that is created or updated with an addition is transmitted from the controller 1 to the root device 4-1. Thereafter, during operation of the audio system 10, the system management table is updated by the root device 4-1 whenever any component device is severed or reconnected. The root device 4-1 periodically transmits to each component device and the controller 1 all or a portion of the content of the system management table as system information. Thereby, each component device and the controller 1 can always possess the latest system information. Transmission of the above system information is described in detail below.

The system management table is identified by a system ID for identifying this audio system 10. The system management table stores, for each component device and in association with the device ID of each device, information such as the upper side (slave unit side)/lower side (internal access point side) MAC address (that is, the MAC addresses of the wireless LAN communication units 56/57), the upper side/lower side IP addresses (that is, the IP addresses of the wireless LAN communication units 56/57), the number of connection stages from the root device 4-1 (HOP number), presence of start of internal access point, number of lower devices (child number) connected to the internal access point 4A, and the like.

Each component device has an individual IP address. In this audio system 10, a multicast address is set up as a multicast group. By transmitting the IP packets of the above-mentioned system information to this multicast address, all the component devices of audio system 10 can receive system information packets. By multicast transmission, it is possible to reduce the load of the network 9. However, system information packets may also be transmitted by unicast to the IP address of each component device.

The audio control table of FIG. 6 stores various types of information in correspondence with the device ID of each device, such as the upper side IP address of each component device (the IP address of the wireless LAN communication unit 56), the device type, installation location, group, service, volume value and the like. Each column of the audio control table and each column of the system management table are associated by device ID. The controller 1 creates a control screen based on the contents of this audio control table (refer to FIGS. 12-14), and receives control of each component device by a user. The controller 1 periodically transmits all or some of the content of the audio control table and room table described below to each component device as setting information. Thereby, each component device can always hold the latest setting information.

An installation location (room name) is information that specifies the room (area) in which the audio device is installed. The installation location is transmitted from the app (controller 1) during registration of a device in the system and is stored separately from the audio control table in each component device. In FIG. 6, the name is displayed as the installation location, but the room ID of the room in which the device is installed may for example be registered as the installation location. The room ID is matched with each information in the room table shown in FIG. 7. FIG. 7 is a diagram showing an example of the room table. Information relating to the room in which the audio device 4 is installed is registered in the room table. Specifically, the room name and background image are registered in association with the room ID. A room name is name data of a room, such as a living room (Living Room). This room name is registered in the memory 60 of the audio device 4 as "room name" The background image is an image used as a background image of a room selection button (area selection image) or the like that is displayed in the control screen in the mobile phone 1. For example, the filename of image data is registered as the background image.

Group denotes information of the group to which an audio device (room) belongs, and indicates the group that performs synchronous playback of content mentioned above. Only one group is set in this embodiment. Each of the audio devices that belong to one group is set to either a synchronous playback master (master device) or a synchronous playback client (client device).

A synchronous playback master is in charge of the supply of an audio source to an entire group and control of synchronous playback, while itself also functioning as one device in the synchronous playback. A synchronous playback client reproduces content according to instructions of the synchronous playback master. For example, "1A" shown in FIG. 6 indicates the audio playback device (room) that belongs to a group as a synchronous playback master. "1B" indicates the audio playback device (room) that belongs to a group as a synchronous playback client (synchronous playback slave). When something other than "1A" and "1B" is registered as a group, it indicates that an audio playback device does not belong to the group. By manipulating the controller 1 as described above, groups can be set in units of rooms (areas). Details are described below.

A service indicates the audio source which an audio device can play back. As services, there are CDs (CD player), Radio (including FM broadcasts and Internet radio), and net distribution. Net distribution is a function in which the audio device 4 accesses a distribution server 6 of a music distribution service via the Internet 5 and downloads by streaming the audio data of a musical piece (content) that was selected by the user for playback. In order to control net distribution of the audio device 4 using the mobile phone 1 (100), the net distribution control program 170 is started by the mobile phone 1 (100).

When constructing the audio system 10, first, the root device 4-1 is set up, and the audio system 10 is constructed. Then, the audio devices 4 other than the root device 4-1 are added to this audio system 10. A user performs the following procedure. The audio device 4-1 to be the root device is connected to the wired LAN 2 via a cable. The controller 1 is started in setup mode on the mobile phone 1. The connect button 59A of the audio device 4-1 is pressed. If a user performs the above operation, the controller 1 and the root device 4-1 will communicate with each other and the audio system 10 will be constructed automatically. Thereafter, when adding new audio devices 4 to the audio system 10, the user starts the controller 1 in setup mode, turns on the audio device 4 to be added (and starts the wireless LAN communication units 56 and 57), and presses the connect button 59A. Then, that audio device 4 communicates with the controller 1 and the root device 4-1, and by automatically generating a password from the aforementioned SSID, is automatically added to the audio system 10.

Referring to FIGS. 8 to 11, the communication procedure of the controller 1 and the audio device 4 at the time of construction of the audio system 10 and when adding the audio device 4 to the audio system 10 is explained.

Figure 8:
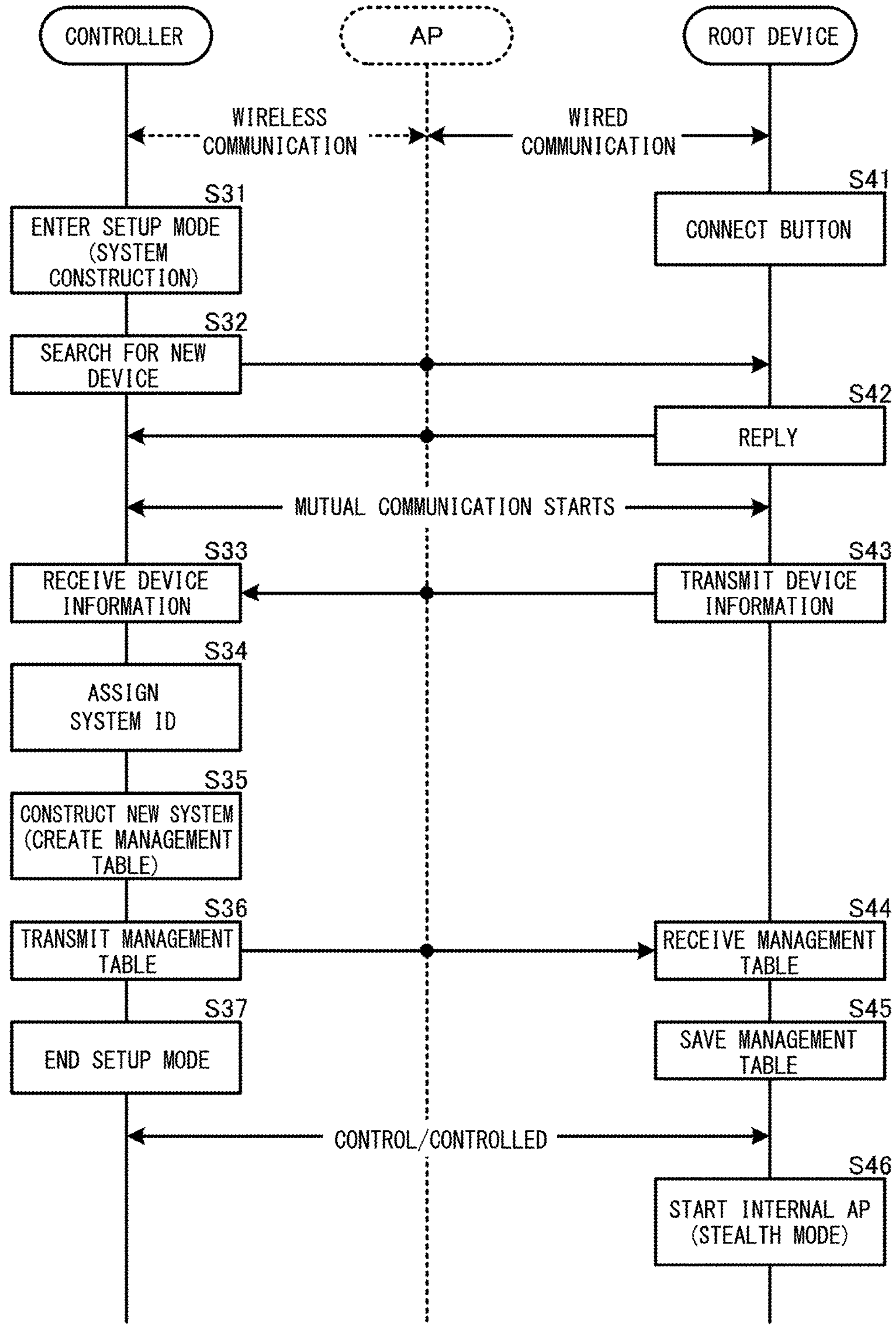
FIG. 8 is a diagram that shows the communication procedure of the controller and audio device in the embodiment of this invention.

FIG. 8 is a diagram showing the communication procedure between the controller 1 and the audio device 4-1 to be the root device when newly constructing the audio system 10. With the audio system control program 70 started, the mobile phone 1 functions as the controller 1. When the controller 1 enters the setup mode by a user manipulation (Step S31), a guidance screen that requests the pressing of the connect button 59A on the audio device 4 is displayed in the display unit 41. In accordance with the guidance of this screen, the user presses the connect button 59A of the audio device 4-1 (Step S41). Next, the controller 1 searches for the new audio device connected to the wired LAN 2 (Step S32). This search is performed by transmitting the message that requires a reply, such as polling. The audio device 4-1 responds to this search (Step S42). Thereby, the controller 1 and the audio device 4-1 start mutual communication via wired the LAN 2 and the access point 3.

The audio device 4-1 transmits its own device information (MAC address, IP address, etc. of the wireless LAN communication unit) to the controller 1 (Step S43). The controller 1 constructs the new audio system 10 that has this audio device 4-1 as the root device. The controller 1 assigns a system ID to the audio system 10 (Step S34), creates the system management table and the audio control table shown in FIGS. 5 and 6, and constructs the audio system 10 having the currently communicating audio device 4 as the root device (Step S35). When the audio system 10 is constructed, the controller 1 transmits a system management table to the audio device 4-1 that is the root device (Step S36) and ends the setup mode (Step S37). The audio device 4-1 receives this system management table (Step S44) and saves the system management table (Step S45). Thereby, the audio system 10 is constructed which makes the audio device 4-1 the root device, which is the root constituent element (component). Thereafter, a musical piece to be played back and the volume thereof come to be controlled by the controller 1. The audio device 4 starts an access point in stealth mode (Step S46).

During creation of the system management table and the audio control table in Step S35, the controller 1 presents to the user of the controller 1 the room table shown in FIG. 7, and has the user select the installation location of the audio device 4-1. When the installation location is selected by the user, the installation location (room ID) is registered in the audio control table. Simultaneously, the controller 1 generates the device name for display of this audio device 4-1 and sets the generated device name to the audio device 4-1. This device name is the device name for a non-group (described in detail below), and is set to be the selected room name. That is, this device name is "Living Room" in the case of the audio device 4-1. This device name is the name displayed when a communication device other than the controller 1 (for example, the net distribution controller 100) has accessed the audio device 4-1. The audio device 4-1 stores the device name in the memory 60 on the basis of the received setting request.

Figure 9:
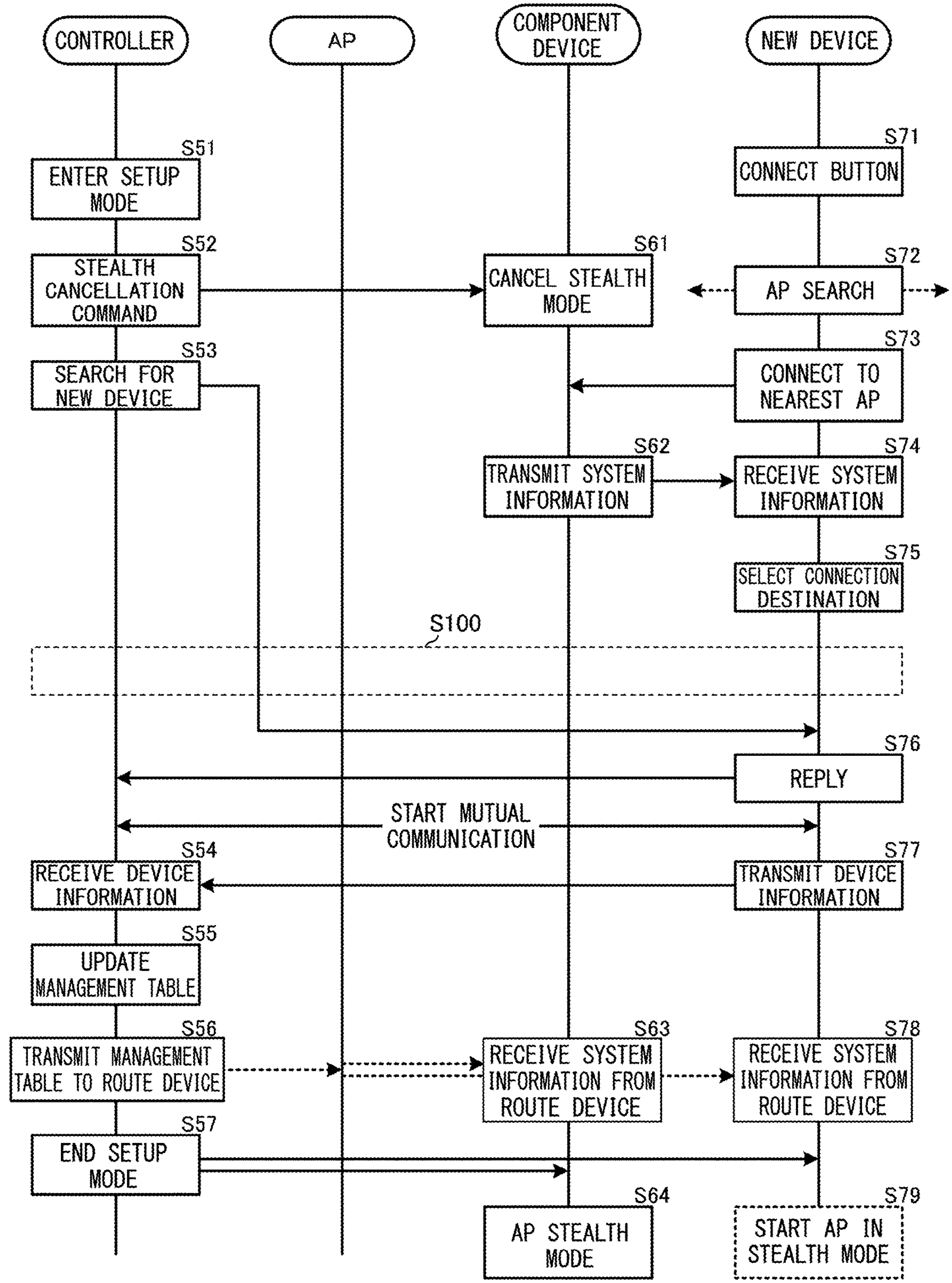
FIG. 9 is a diagram that shows the communication procedure of the controller and audio device in the embodiment of this invention.

FIG. 9 is a diagram showing the communication procedure in the case of a new audio device being added to the constructed audio system 10. The component device is the audio device 4 which already serves as a component of the audio system 10, and here is the root device or node device in which the internal access point 4A has been started. A new device is the audio device 4 to be newly added.

When the mobile phone 1 that functions as the controller 1 enters the setup mode by a user manipulation (Step S51), a guidance screen requesting pressing of the connect button 59A on the audio device 4 (new device 4) is displayed in the display unit 41. In accordance with the guidance of this screen, the user presses the connect button 59A of the new device (Step S71). The controller 1 instructs the component device that is the audio device 4 that is already registered to cancel the stealth mode of the internal access point 4A (Step S52). Thereby, the component device cancels the stealth mode of the internal access point 4A, and by sending a beacon frame giving notification of its own existence, enables a passive scan of the new device (Step S61). Next, the controller 1 starts a search for the new device (Step S53).

The new device, when the connect button 59A is pressed by the user (Step S71), enters the initial connection mode and searches for a connectable access point (passive scan) (Step S72). In this search, the new device discovers the internal access point 4A of a component device as a connectable access point. As described above, the internal access point 4A has an SSID that is capable of identifying it as a device of the audio system 10 viewed from the new device, and is capable of connection by generating a password from the SSID (or the MAC password). The new device selects the nearest (most easily connectable) internal access point 4A from among the discovered internal access points 4A, and using this SSID and generated password, temporarily connects to the selected internal access point 4A (Step S73). This connection is a temporary connection for acquiring system information and is not a regular connection for joining the audio system 10. The new device acquires the system information of the audio system 10 at this time from the connected internal access point 4A (component device) (Step S62, Step S74). The system information is information that includes all or a portion of the content of the system management table, and is periodically updated and distributed to the other component devices by the root device 4-1. On the basis of the acquired system information, the new device selects the most suitable access point for joining the audio system 10 (Step S75). This selection is performed on the basis of the signal strength of each access point, the number of stages from the root device 4-1, the number of component devices connected to that access point, and the like, and the access point appearing to have good communication conditions is selected.

Figure 10:
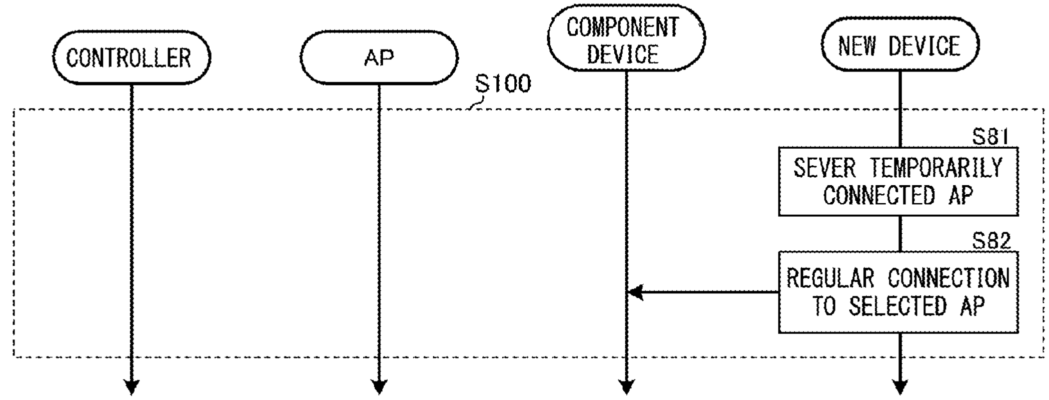
FIG. 10 is a diagram that shows the communication procedure of the controller and audio device in the embodiment of this invention.
Figure 11:
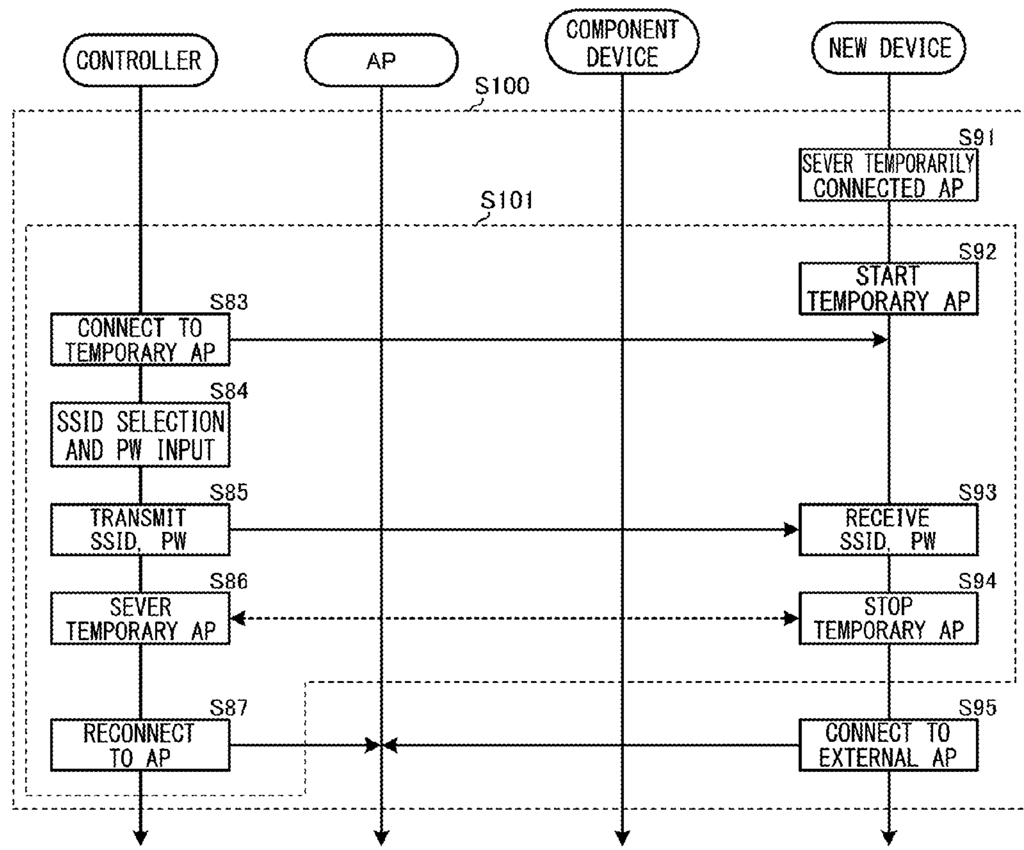
FIG. 11 is a diagram that shows the communication procedure of the controller and audio device in the embodiment of this invention.

The example of FIG. 9 (the example in which Step S100 is not executed) shows the flow of the case in which the internal access point 4A that was temporarily connected is judged to be best suited for regular connection, and the connection destination is not changed. For example, the case of the new device being connected to the internal access point 4A-1 of the root device 4-1 corresponds to the example shown in FIG. 9. In the case of changing the connection destination from the internal access point 4A of the temporary connection at the time of the regular connection, the procedure from FIG. 10 or FIG. 11 is executed in the interval of Step S100 shown in FIG. 9. When the regular connection is completed (in the case of FIG. 9, after the temporary connection is made a regular connection), the new device receives a new device search message from the controller 1 (Step S53) and replies to that message (Step S76). With this, the new device is capable of communicating with the controller 1. Thereby, the new device becomes a constituent element (component) of the audio system 10, with the musical piece being played back and the volume thereof being controlled by the controller 1.

The new device transmits device information of itself (the MAC address and IP address of the wireless communication unit, installation location, and the like) to the controller 1 (Step S77). The controller 1 receives this device information (Step S54), and registers this new audio device 4 in the system management table and the audio control table to update them (Step S55). The controller 1 transmits the updated system management table to the root device 4-1 (Step S56) and ends the setup mode (Step S57). The root device 4-1 periodically distributes the system information including all or a part of the system management table as a connection formation message to the other component devices. Notification of the setup mode termination is transmitted from the controller 1 to all of the audio devices 4, but is not limited to this case. The controller 1 may perform notification of the setup mode termination to the root device 4-1, and the root device 4-1 may forward that notification to the other audio devices 4 of the audio system 10.

During updating of the system management table and the audio control table in Step S55, the controller 1 presents the room table shown in FIG. 7 to the user of the controller 1 and has the user select the installation location of the new audio device 4. When the installation location is selected by the user, the installation location (room ID) is registered in the audio control table. At the same time, the controller 1 generates a device name for display of this new audio device 4, and sets the generated device name to the new audio device 4. The device name is made the selected room name. That is, this device name is "Dining Room" in the case of the audio device 4-2. This device name is the device name for a non-group (described below) and is the name that is displayed when a communication device other than the controller 1 (for example, the net distribution controller 100) has accessed the new audio device 4. The new audio device 4 stores the device name in the memory 60 on the basis of the received setting request.

The new device that has received the system information from the root device 4-1 stores this system information (Step S78). Then the new device starts the internal access point 4A in stealth mode (Step S79). Also, a component device that has received the system information from the root device 4-1 updates the system information stored internally using this information (Step S63). The component device returns the internal access point 4A to the stealth mode (Step S64). By the above process, it is possible to add a new device to the constructed audio system 10. Setting up an internal access point 4A in stealth mode with a component device and a new device is only performed in a root device and a node device, with the processes of Step S64 and Step S79 not performed in a leaf device and a branch device.

FIG. 10 is a diagram that shows the communication procedure for severing the internal access point 4A temporarily connected in Step S75 and reconnecting to another internal access point 4A in the tree. When another internal access point 4A is selected as the connection destination for a regular connection in Step S75 of FIG. 9, the new device severs the internal access point 4A that is currently temporarily connected (Step S81) and makes a regular connection using the address information of the system information to the selected internal access point (Step S82). After this, the process proceeds to Step S76 of FIG. 9.

FIG. 11 is a diagram that shows the communication procedure for severing the internal access point 4A temporarily connected in Step S75 and reconnecting as a branch device to the external access point 3. When the external access point 3 is selected as the connection destination for a regular connection in Step S75 of FIG. 9, the new device severs the internal access point 4A that is currently temporarily connected (Step S91) and starts a temporary access point only during initial connection in a standalone manner (Step S92). That is, the new device starts the internal access point 4A only connected to a new device without being connected to the wired LAN 2. The controller 1 stores beforehand the SSID and the password of this initial connection temporary access point. That is, this SSID and password are written beforehand in the audio system control program 70 as data. Accordingly, the controller 1 discovers this temporary access point in the new device search started in Step S53, once cancels the connection with the external access point 3, and connects to the temporary access point started by the new device (Step S83). There is a high possibility that the controller 1 cannot acquire the SSID and the password of the external access point 3 from the system program of the mobile phone 1. For this reason, here, the user is asked to input the SSID and the password of the external access point 3 (Step S84). For the input of the SSID, a system may be adopted that displays a list of connection destinations (SSID) that are visible at that time in the display and has the user select the SSID of the external access point 3. The user is made to input the password (normally appearing on the unit of the external access point 3).

The controller 1 transmits the connection information that has been input to the new device that has started the temporary access point (Step S85). The new device receives this connection information (Step S93). The controller 1, after transmitting the connection information (SSID, password) of the external access point 3 to the new device, cancels the connection with the temporary access point (Step S86). The new device stops the temporary access point upon receiving from the controller 1 connection information of the external access point 3 (Step S94). The controller 1 reconnects with the external access point 3 with which the connection was once cancelled (Step S87). The new device connects to the external access point 3 using the connection information that was acquired (Step S95). Then, returning to the procedure of FIG. 9, the controller 1 performs a search for the new device (Step S53), and the new device responds to this search (Step S76). In the case of connection information of the external access point 3 being included in the system information acquired from the component device that was temporarily connected, the process shown in Step S101 (Steps S83 to S87, Steps S92 to S94) is omitted, and connection to the external access point 3 may be reconnected to similarly to FIG. 10.

Figure 12:
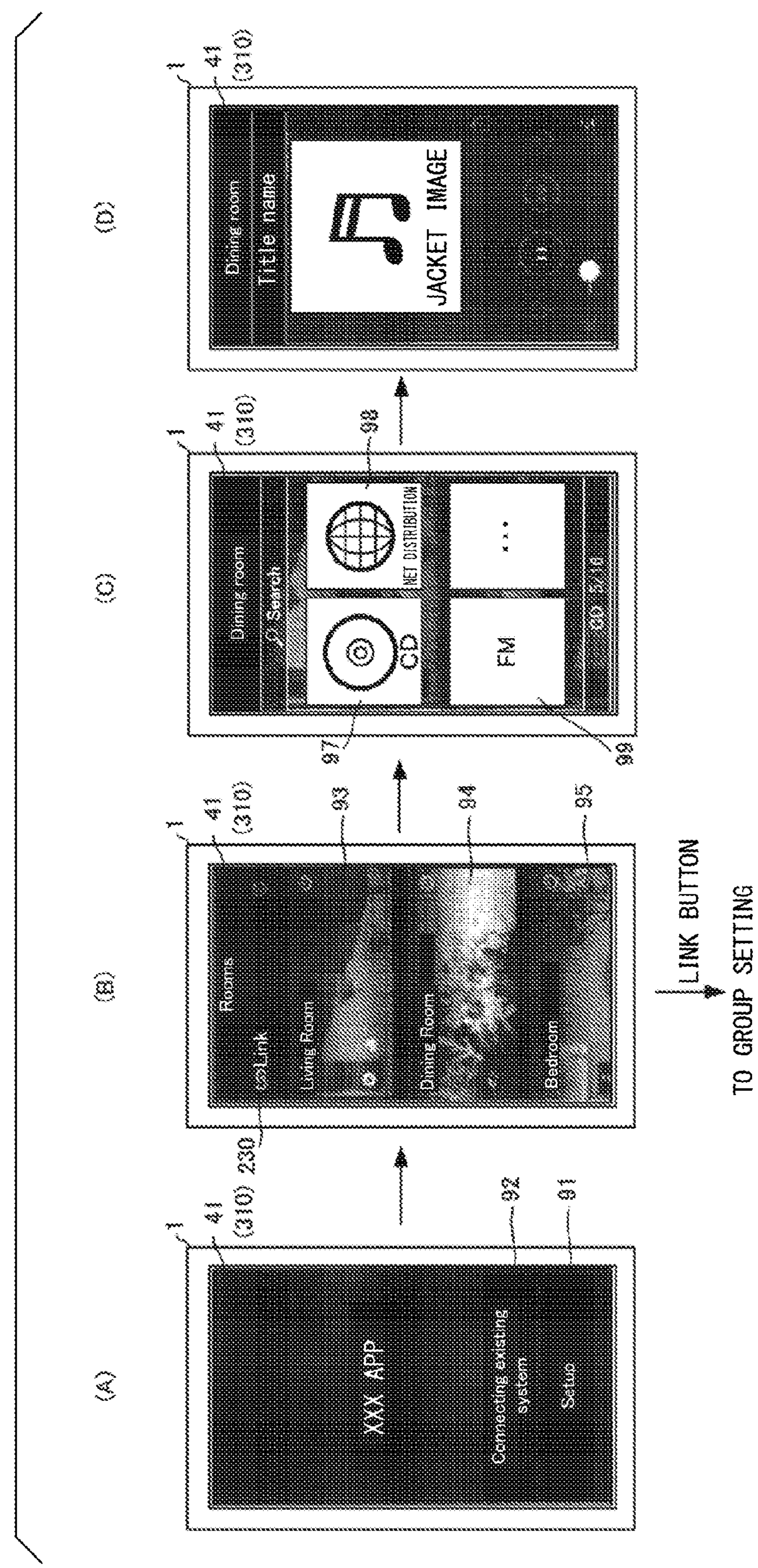
FIG. 12 is a diagram that shows an example of the control screen (initial menu screen, room selection screen, source selection screen) of the mobile phone shown in FIG. 2.
Figure 13:
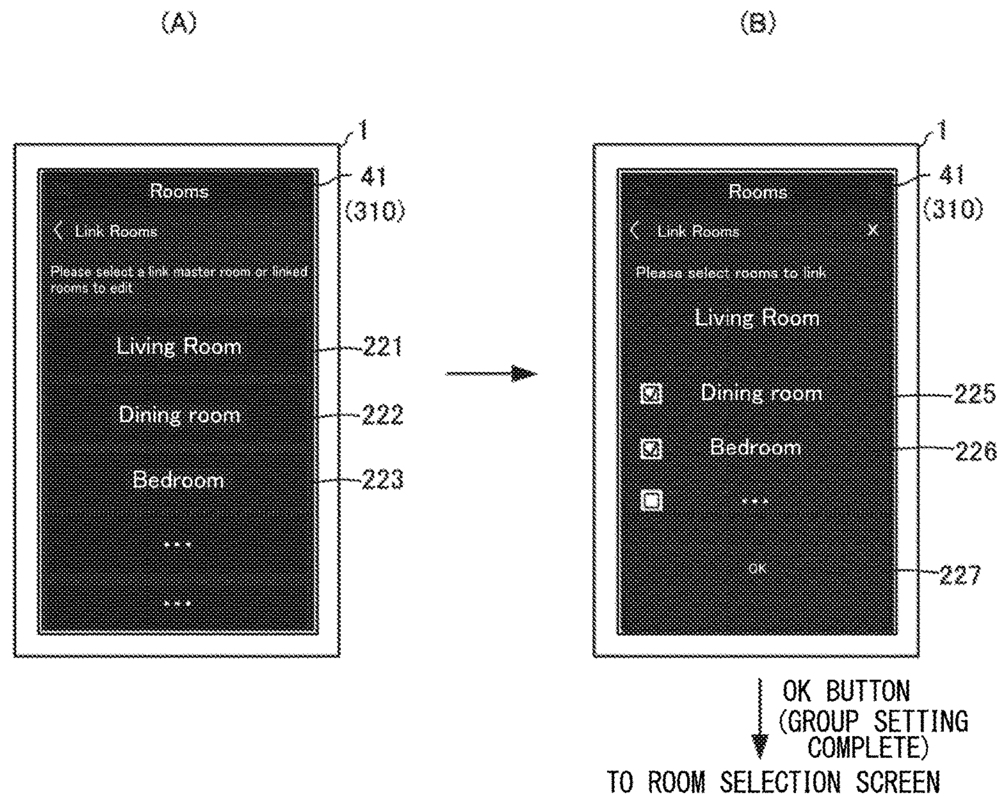
FIG. 13 is a diagram that shows an example of the control screen (master room selection screen, client room selection screen) of the mobile phone shown in FIG. 2.
Figure 14:
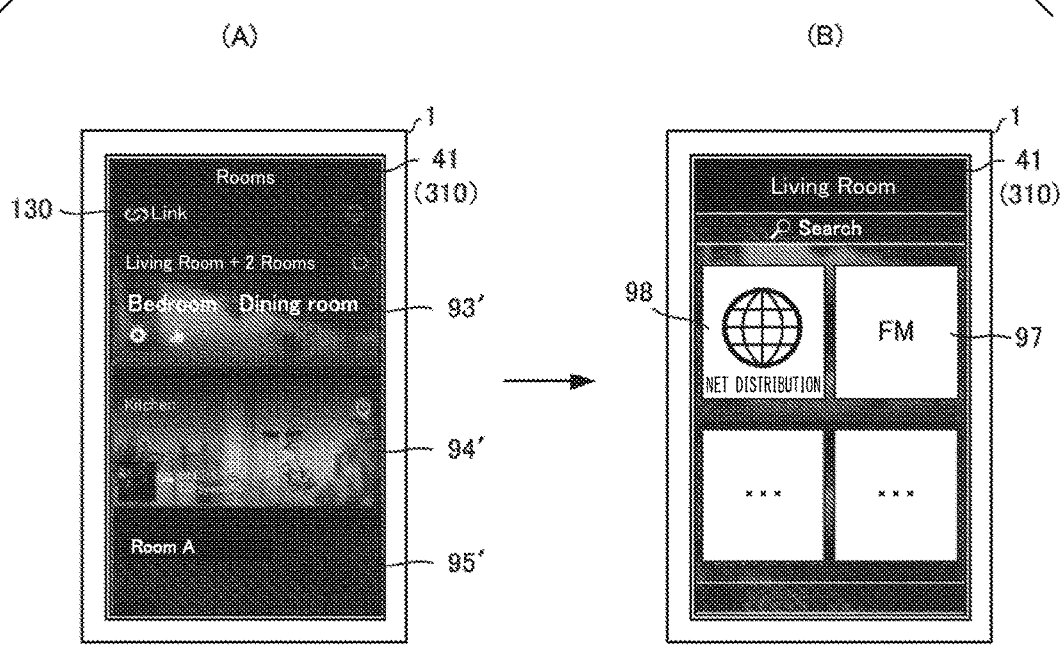
FIG. 14 is a diagram that shows an example of the control screen (room selection screen, source selection screen) of the mobile phone shown in FIG. 2.

Next, with reference to the control screen (the display content of the display unit 41) of the controller 1 (mobile phone 1) in the audio system 10 given in FIGS. 12 to 14, the control procedure (playback procedure and group setting procedure) of the audio device 4 using controller 1 is explained. Part (A) of FIG. 12 to part (D) of FIG. 12 are diagrams showing an example of the control screen during playback control. Part (A) of FIG. 12 and part (B) of FIG. 13 are diagrams showing an example of the control screen during group setting. Part (A) of FIG. 14 and part (B) of FIG. 14 are diagrams showing an example of the control screen during playback control after group setting.

When the controller 1 is started, the control screen is displayed in the display unit 41. At first, the initial menu screen of part (A) of FIG. 12 is displayed. When the user taps the setup button 91 (Setup), the touch panel 410 detects this manipulation and the aforementioned setup mode is started. When the user similarly taps the system connection button 92 (Connecting existing system), communication with the audio device 4 of the audio system 10 is started. In this embodiment, control is performed in room (area) units.

First, the playback procedure of making the audio device 4 play back an audio source is explained. When communication between the controller 1 and the audio device 4 is started, a room selection screen (list screen) such as shown in part (B) of FIG. 12 is displayed in the control screen (display unit 41) of the controller 1 (mobile phone 1). Room selection buttons for selecting the room in which the audio device 4 is installed are displayed in the room selection screen. Each room selection button has an image in which the name of the room (room name) is displayed on the aforementioned background image. The device name that is set to the audio device 4 is the same as the room name that is displayed on the aforementioned room selection button.

In the example of part (B) of FIG. 12, three room selection buttons 93 to 95 are displayed. The room selection button 93 is a button for selecting the living room, and audio device 4-1 is selected by tapping this button. Room selection button 94 is a button for selecting the dining room, and audio device 4-2 is selected by tapping this button. Room selection button 95 is a button for selecting the bedroom, and audio device 4-3 is selected by tapping this button. When the user manipulates (taps) any of the room selection buttons 93 to 95, the audio device 4 of that room will be selected. In the example of part (B) of FIG. 12, three are three room selection buttons 93 to 95 displayed in the control screen, but it is possible to display other room buttons by scrolling the control screen with a touch manipulation.

If any of the room selection buttons is selected (tapped) by the user, the controller 1 will display the source selection screen of the selected room. Icon buttons (source selection images) indicating playable sources (possible services) of the audio device 4 that is installed in the selected room are displayed in the source selection screen. Part (C) of FIG. 12 shows the source selection screen when the dining room is selected by tapping the room selection button 94. Icon buttons 97 to 99 indicating the playable sources of the audio device 4-3 installed in the dining room are shown in this source selection screen.

The icon button 97 (CD) is a button for selecting CD. The icon button 98 (net distribution) is a button for selecting net distribution by the distribution server 5. Icon button 99 (FM) is a button for selecting FM (radio). The selected source is played back by a user selecting one of the icon buttons 97 to 99.

For example, in part (C) of FIG. 12, when the icon button 97 is selected, the controller 1 transmits a command message for starting playback of a CD to the audio device 4-3, and displays the CD playback screen (Now Playing screen) as shown in part (D) of FIG. 12. Manipulation parts, such as a PLAY/PAUSE button and a volume slider, are displayed in this screen. The user can perform playback/stop and volume control of a musical piece (music data) of a CD by operating these manipulation parts. In part (C) of FIG. 12, if the icon button 98 (net distribution) is selected, the net distribution controller 100 will be started in the mobile phone 1, and net distribution content will be played back in this audio device.

Next, the setting procedure for a group that synchronously plays back the same source in a plurality of rooms (audio devices 4) will be described. In the group setting procedure, the audio device to be the master of the group (master device) and the audio device to be the client (client device) are selected. The group setting procedure will be described referring to FIG. 13.

The group setting procedure is started by selecting a link button 230 (Link) shown in part (B) of FIG. 12. When the link button 230 is selected, the master room selection screen shown in part (A) of FIG. 13 is displayed. In the master room selection screen, the master room selection buttons 221 (Living Room), 222 (Dining Room), 223 (Bedroom) are displayed for selecting the master to become the supply source of the audio signal (audio source) synchronously played back by the group. In this screen, when for example the master room selection button 221 is manipulated, the living room is selected as the master room (master area), and the audio device 4-1 is the master for synchronous playback. In part (A) of FIG. 13, for aiding comprehension only the three buttons 121 to 123 are displayed as the master room selection buttons, but buttons of the rooms that can be selected as the master may all be displayed.

When the master room is selected, the screen display transitions to the client room selection screen shown in part (B) of FIG. 13. In the client room selection screen, client room selection buttons 225 (Dining room) and 226 (Bedroom) are displayed for selecting a client of the group. When the client room selection button 225 or 226 is tapped, a checkmark is displayed in the checkbox in the button that was tapped, and the button enters the selected state. Part (B) of FIG. 13 shows the state in which both client room selection buttons 225 and 226 have been tapped. In this case, a checkmark appears in both checkboxes of the client room selection buttons 225 and 226, whereby the dining room and the bedroom become client rooms (client areas), and the audio devices 4-2 and 4-3 becomes clients.

After the above procedure, by a determination button 227 (OK) being manipulated by the user, the group setting is completed. This group information is registered in the audio control table shown in FIG. 6. In the audio control table shown in FIG. 6, group information following the aforementioned example is registered, with the master room being the living room (master: audio device 4-1) and the client rooms being the dining room and the bedroom (clients: audio devices 4-2 and 4-3). When the group has been set, the same audio signal (audio source) is played back in synchronization by the audio devices 4 belonging to the group. The audio source is played back by the master audio device 4 (master device), and that audio signal is distributed from the master device to the audio devices 4 (client devices) of the clients. Accordingly, audio sources played back by the group are limited to the sources that can be played back by the master device.

After completion of the group setting manipulation, the controller 1 transmits a request to set the device name for the group to the master audio device 4. In the example above, the controller 1 transmits the setting request of the group name "Living Room+2 Rooms" as information of the device name for the group. In the audio device 4-1, the aforementioned group name is stored in a "group name" storage area of the memory 60.

The device name for a non-group is the room name of the room in which that audio device 4 is installed, and does not include information relating to a group. In contrast, the device name for a group includes the room name of the room in which that audio device 4 is installed and information relating to the group (for example, the number of client rooms described above). After completion of the group setting manipulation described above, a setting request for the device name that includes information of the device name for a non-group is transmitted to the master whose group setting has been cancelled.

After completion of the group setting manipulation, the display returns to the room selection screen from the client room selection screen shown in part (B) of FIG. 13. Part (A) of FIG. 14 shows an example of the room selection screen in the case of a group setting existing. When a group is set, the group setting is reflected in the room selection screen. That is, in the example of part (A) of FIG. 14, the group setting of FIG. 6 is reflected, so in the room selection button 93' for the living room, which is the master room, the display of the room name is changed to the group name (Living Room+2 Rooms) that can specify that it is the master room of the group. In addition, the room names of the client rooms (Bedroom, Dining Room) are added, and a fogging is added to the background image. The room selection buttons of the dining room and the bedroom, which are the client rooms, are not displayed (deleted), and instead the room selection buttons 94' and 95' of "Kitchen" and "Room A" are displayed. The "2 Rooms" of "Living Room+2 Rooms" indicates that two rooms (the audio devices 4-2 and 4-3) are included as clients in the group having the living room as the master. The display of this group name in the audio system controller 1 is performed with reference to the audio control table (FIG. 6). For this reason, it is not required for the audio system controller 1 to query the master device 4-1 for the display name.

Then, when the room selection button 93' of the living room has been selected in the room selection screen shown in part (A) of FIG. 14, the source selection screen of the audio device 4-1, which is the master device, is displayed as shown in part (B) of FIG. 14. After a source is selected in the source selection screen of part (B) of FIG. 14, the same playback screen as part (D) of FIG. 12 is displayed, and synchronous playback by the audio devices 4-1 to 4-3 of the living room, the dining table, and the bedroom is executed. For control of synchronous playback, technology such as disclosed in Japanese Unexamined Patent Application, First Publication No. 2015-100085 may be applied.

Figure 15:
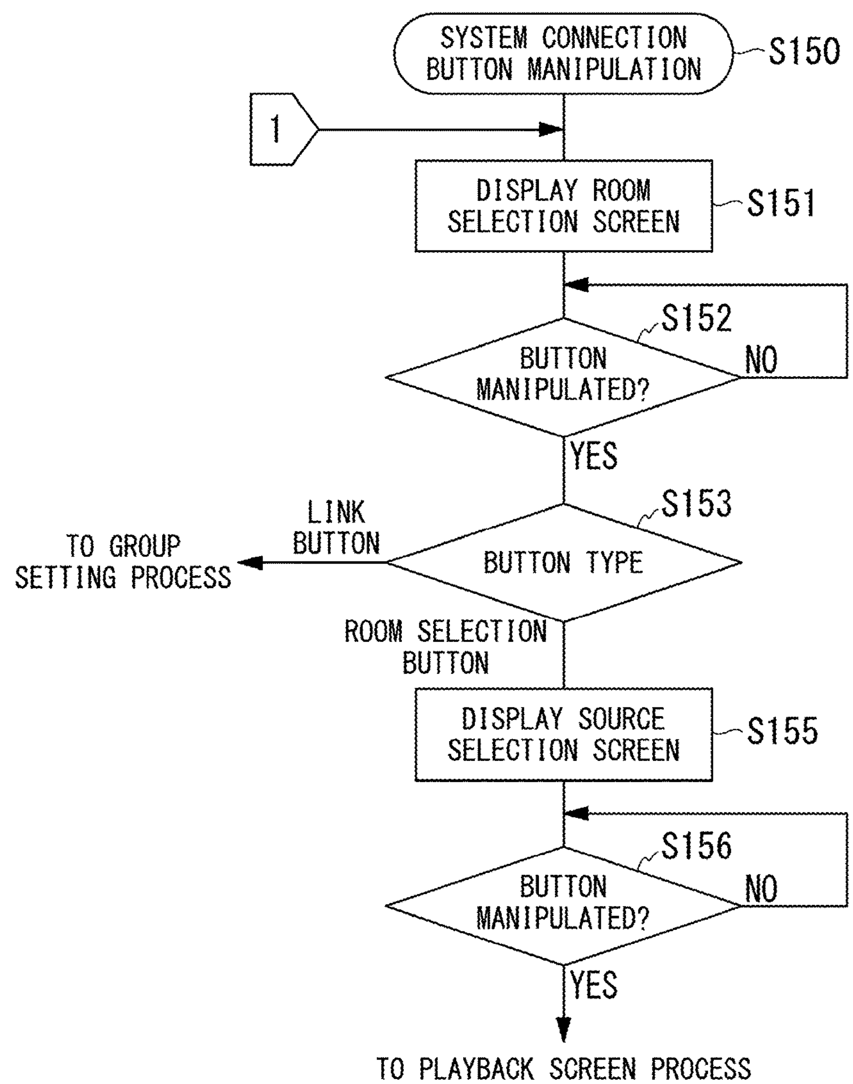
FIG. 15 is a flowchart that shows the control process of the controller (control unit) in the embodiment of this invention.

Next, with reference to FIG. 15, the processing operation of the controller 1 (control unit 20) in the audio system 10 is explained. When the system connection button 92 is pressed by the user (Step S150), this process is started. Illustration of some of the process is omitted.

First, the controller 1 displays a room selection screen as shown in part (B) of FIG. 12 in the display unit 41 based on the system management table, the audio control table, the room table and the like (Step S151). The controller 1 stands by until any of the buttons on the room selection screen is manipulated (Step S152). When any one of the buttons has been manipulated (YES in Step S152), the controller 1 will perform the process according to the manipulated button (Step S153). The controller 1 performs the group setting process (refer to FIG. 16) when the link button 230 is manipulated. When any of the room selection buttons is manipulated, the controller 1 displays in the display unit 41 the source selection screen of the selected room as shown in part (C) of FIG. 12 (Step S155). Specifically, the controller 1 displays the source selection screen based on information of services of the audio control table for the audio device corresponding to the room selection button that has been selected, the room table, and the like. The controller 1 stands by until the icon button of any source has been manipulated (Step S156). If an icon button is manipulated (YES in Step S156), the playback screen corresponding to the selected icon button (source) is displayed as shown in part (D) of FIG. 12, and the processing on the playback screen advances.

Figure 16:
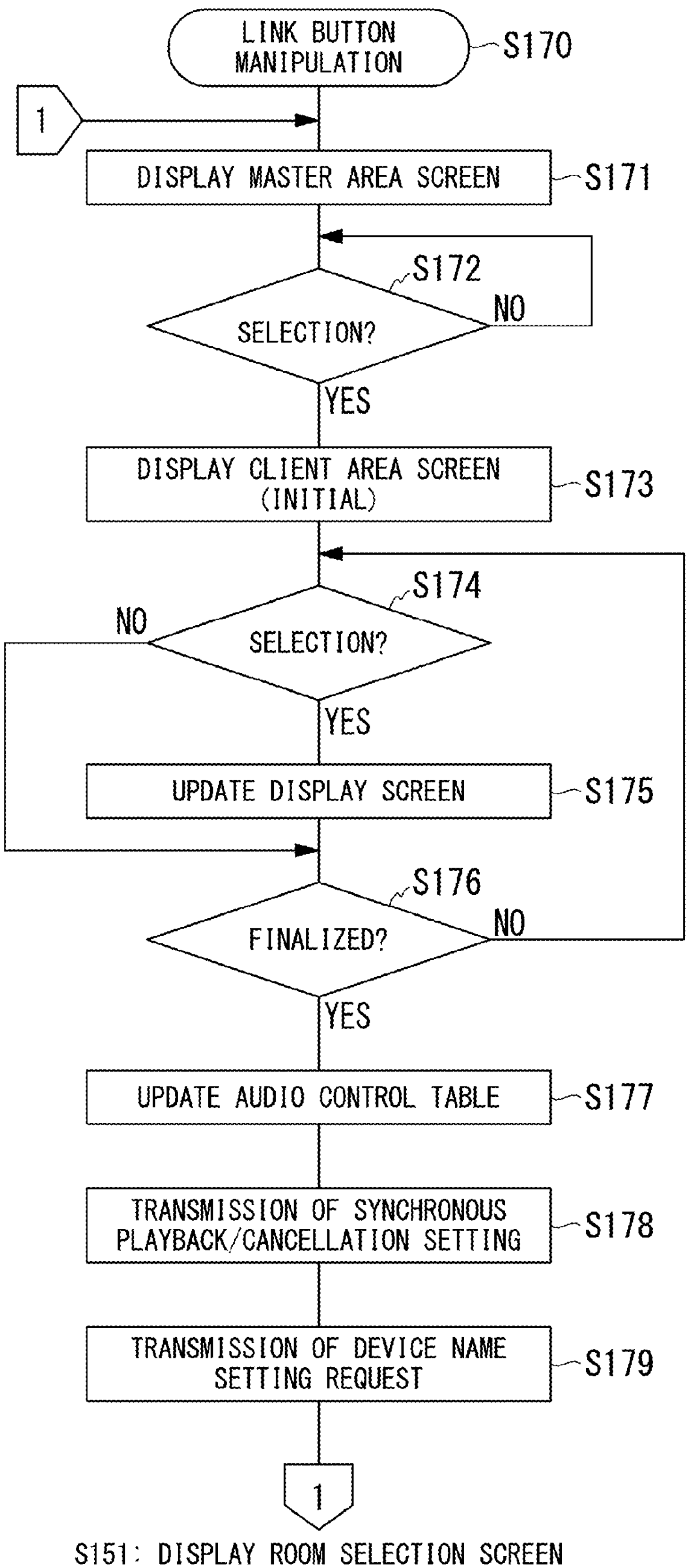
FIG. 16 is a flowchart that shows the group setting process of the controller (control unit) in the embodiment of this invention.

Next, with reference to FIG. 16, the group setting process of the controller 1 in this audio system 10 will be described. FIG. 16 is a flowchart that shows the first group setting process of the controller 1 (control unit 20). When the link button 230 in the room selection screen is manipulated by the user (Step S170), this process is started.

First, controller 1 displays a master room selection screen as shown in part (A) of FIG. 13 in the display unit 41 (Step S171), and stands by until the master room is selected (Step S172). When the master room is selected (YES in Step S172), the controller 1 displays the client room selection screen corresponding to the selected master room in the display unit 41, as shown in part (B) and the like of FIG. 13 (Step S173). At this time, in the client room selection screen, the initial-state client room selection screen is displayed in which no checkmarks are displayed in the checkboxes.

The controller 1 updates the display of the client room selection screen (Step S175) each time a client room is selected (YES in Step S174). That is, the controller 1 updates the screen so as to add a check icon to the checkbox of the selected room. When there is a check icon in the checkbox of the selected room, the controller 1 updates the screen so as to delete the check icon. The controller 1 repeatedly performs the processes of Step S174 and Step S175 until selection is finalized (Step S176). When the selection is finalized (YES in Step S176), the controller 1 updates the audio control table (FIG. 6) on the basis of the selection result (Step S177).

Then, the controller 1, on the basis of the update content of the audio control table, transmits a command message to the audio devices 4 to perform the setting of synchronous playback and synchronous playback cancellation (Step S178). In greater detail, the controller 1 transmits the master device ID to the client audio devices 4, and performs a setting instruction to output the audio signal input from the master audio device 4 from the speaker. That is, a setting is made so that the client audio device 4 does not perform playback of sources other than those from the master. Moreover, for audio devices 4 for which the synchronous playback group setting has been cancelled, the controller 1 performs instructions to reset the output setting to the client and the input setting from the master.

Next, the controller 1 transmits a command message requesting setting of the device name to the master audio device 4 and the audio device 4 for which the master status has been cancelled (Step S179). In greater detail, the controller 1 transmits a device name for a group (group name) to an audio device 4 set as the master, and performs an instruction for additionally setting the device name. Also, for an audio device 4 for which the master status has been cancelled, the controller 1 performs an instruction to delete the device name for a non-group (return to a room name). Thereafter, the processing proceeds to the process of Step S151 shown in FIG. 15, and the room selection screen is displayed.

In the case of access from another application program such as the net distribution controller 100, when the audio device 4 itself is the master device of the group, the audio device 4 returns the group name as the device name, and when the audio device 4 itself is not the master device of the group, the audio device 4 returns the room name as the device name. When the audio device 4 is a group's client device, it may be made not to answer to other application programs. Thereby, even when other application programs, such as the net distribution controller 100, access the audio device 4, it becomes possible to display the group set up by the audio system 10 (managed by the audio system controller 1). That is, it is referred to when displaying information of the audio device 4 on the control screen of the net distribution controller 100 as shown in part (A) of FIG. 17 and part (B) of FIG. 17.

Figure 17:
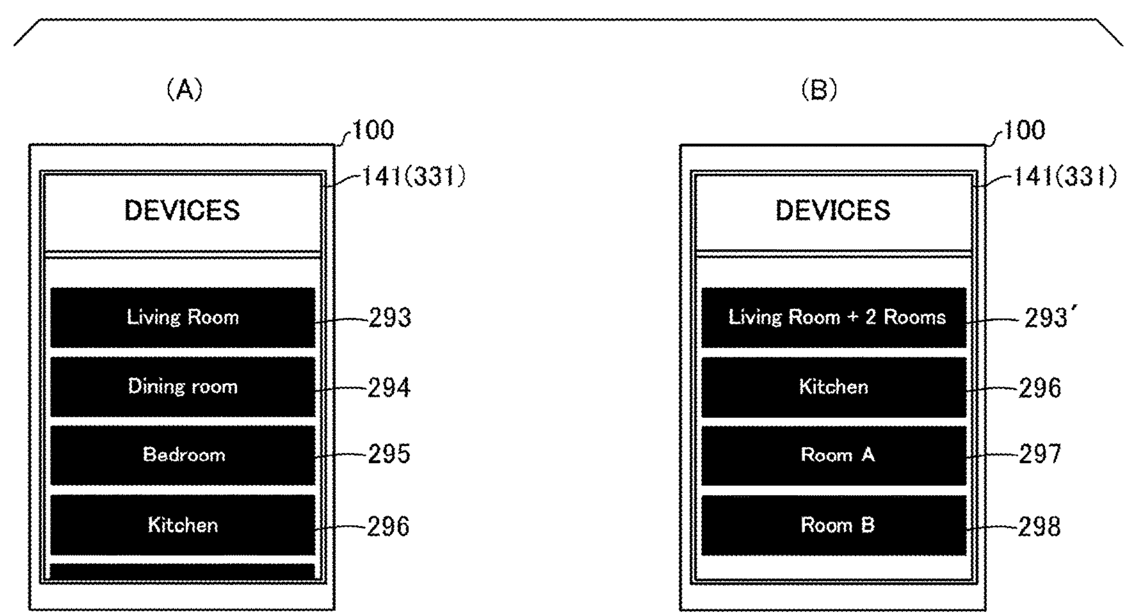
FIG. 17 is a diagram that shows examples of the control screen of the net distribution controller in the embodiment of this invention.

Next, with reference to the control screen (the display content of the display unit 141) of the net distribution controller 100 (mobile phone 100) of FIG. 17, the control procedure (playback procedure) for net distribution (a music distribution service) of the audio device 4 using the net distribution controller 100 is described. Part (A) of FIG. 17 and part (B) of FIG. 17 are diagrams showing examples of the control screen at the time of playback control by the net distribution controller 100.

When the net distribution controller 100 is started, a communication connection request is transmitted to the audio devices 4 connected to the network 9. This communication connection request is a connection request that seeks a response from an audio device which has the authority to access the music distribution service managed by the net distribution controller 100. By the corresponding audio device 4 replying to this connection request, the existence of the audio device 4 is recognized by the net distribution controller 100. When replying, the audio device 4 transmits to the net distribution controller 100 information including the IP address and device name (room name or group name).

Then, as a list screen of the audio devices 4 that have responded to this connection request, a device selection screen as shown in part (A) of FIG. 17 and part (B) of FIG. 17 is displayed in the display unit 141. Device selection buttons for selecting audio devices 4 with which a communication session has been established are displayed in the device selection screen. Each device selection button has an image in which the device name is displayed. The device name contained in a device selection button is displayed based on the information of the device name (a room name or a group name) received from the audio device 4. Therefore, when the audio device 4 is the group's master, the device name for the group is displayed on the device selection button, and when audio device 4 does not belong to a group, the device name for a non-group is displayed on a device selection button. With reference to part (A) of FIG. 17, the device selection button in which the device name for a non-group is displayed will be described first.

Part (A) of FIG. 17 shows the state of a communication session having been established between all of the audio devices 4-1 to 4-6 in the state in which a group has not been set for any of the audio devices 4-1 to 4-6 of the network 9.

In the example of part (A) of FIG. 17, the four device selection buttons 293 to 296 are displayed. The device selection button 293 is a button for selecting the audio device 4-1 (living room). As the device selection button 293, the device name for a non-group (that is, room name) "Living Room" of the audio device 4-1 is displayed. The device selection button 294 is a button for selecting the audio device 4-2 (dining room). As the device selection button 294, the device name "Dining Room" of the audio device 4-2 is displayed. The room selection button 295 is a button for selecting the audio device 4-3 (bedroom). As the room selection button 295, the device name "Bed Room" of audio device 4-3 is displayed. The device selection button 296 is a button for selecting the audio device 4-4 (kitchen). As the device selection button 296, the device name "Kitchen" of audio device 4-4 is displayed. When the user manipulates (taps) any of the device selection buttons 293 to 296, the audio device 4 of the room corresponding to the manipulation is selected. In the example of part (A) of FIG. 17, although there are four device selection buttons displayed in the control screen, other device selection buttons can also be displayed by scrolling the control screen with a touch manipulation.

When any of the device selection buttons is selected (tapped) by the user, a screen for designating the musical piece to be played back from among the music data registered in the distribution server 6 of the music distribution service is displayed in the display unit 141. After designation of the musical piece, the playback screen for the selected audio device 4 is displayed in the display unit 141, and a command message to play back music data in the distribution server 6 designated by the user is transmitted to the abovementioned audio device 4 in an internal process. For example, a playback command message is transmitted that includes source setting information that sets distribution data by a music distribution service as the playback source, the distribution server 6 in which the designated music data is registered, and the file name of the music data.

Next, referring to part (B) of FIG. 17, the device selection screen in which the device name for a group is displayed is described. Part (B) of FIG. 17 displays the state of a communication session having been established between the audio devices 4-1 and 4-4 to 4-6 in the state of a group having been set with the audio device 4-1 (Living Room) as the master and the audio devices 4-2 and 4-3 (Dining Room and Bed Room) as clients, as exemplified by the audio control table of FIG. 6.

The audio devices 4-2 and 4-3, being clients, do not receive playback instructions as individual devices and therefore do not respond to communication connect requests from the net distribution controller 100. Accordingly, in part (B) of FIG. 17, room selection buttons 294 and 295 of the audio devices 4-2 and 4-3 (Dining Room and Bed Room) are not displayed, while the other four room selection buttons 293' and 296 to 298 are displayed.

In the example of part (B) of FIG. 17, in the device selection button 293' of audio device 4-1 (Living Room), "Living Room+2 Rooms", which is the device name for a group, is displayed. Accordingly, it is possible to specify the audio device 4-1 being subject to a group setting in the display unit 141 of the net distribution controller 100 as well. In the other room selection buttons 296, 297 (Room A) and 298 (Room B), device names for a non-group are displayed since the corresponding audio devices 4-4, 4-5, and 4-6 are not of the group (master).

Since the net distribution controller 100 periodically receives information of device names with respect to an audio device 4 with which a communication session has been established, when there has been a group setting change, the display of the device selection button is performed in accordance with the setting change.

As mentioned above, it is possible to change the display of the device name of the audio device 4 according to the group setting situation by the controller 1. Therefore, it is possible to specify whether the audio device 4 belongs to a group even by the display of the device name in the net distribution controller 100 or the like.

In the aforedescribed embodiment, the mobile phone 100 executes the net distribution control program 170, but the mobile phone 1 may execute the net distribution control program 170.

In the aforedescribed embodiment, the room name is used as the device name, but it is not particularly limited thereto. For example, the model name (for example, "AV receiver") of an audio device may be used as the room name.

In the aforedescribed embodiment, the group device information is set only for the master audio device, but the group device information may also be set to the client audio device.

In the aforedescribed embodiment, information indicating the number of client rooms is included in the device name for a group. However, provided the display mode is one that enables one to ascertain that a group has been set, it is not particularly limited thereto. For example, the device name for a group may include the room names of the client rooms instead of the number of client rooms.

In the aforedescribed embodiment, the audio device 4 stores both the device name for a group (group name) and device name for a non-group (room name) in the memory 60 as the device name. However, either one of the room name and the group name may be rewritten and stored in one storage area. In this case, each time a device name setting request is received from the controller 1, the device name stored in the memory 60 is updated from the device name for a non-group (room name) to the device name for a group (group name), or from the device name for a group (group name) to the device name for a non-group (room name).

In the aforedescribed embodiment, one audio device is installed in one room, but a plurality of audio devices may be installed in one room. In this case, if a plurality of audio devices are installed in the master room, for example, one audio device is set as the master of synchronous playback from the plurality of devices in accordance with the hop number.

In the aforedescribed embodiment, the system management table, the audio control table, and the like are automatically generated at the time of network connection of an audio device, but it is not particularly limited thereto. The user may input the required information into the controller 1 directly.

In the aforedescribed embodiment, the room selection screen and the like are displayed, whereby selection of an audio device that executes playback and the setting of a group are performed in room (area) units, but it may also be performed in audio device units.

The audio device of the embodiment of this invention may also be an audio-visual (AV) device with an image playback function, and includes a system in which they are mixed. Also, in this embodiment, a control terminal may be realized by the mobile phone 100 in which the audio system control program 170 (application program) is installed, but may also have another constitution. For example, the control terminal may be a device in which the audio system control program 170 is installed in a tablet, and may be a special-purpose terminal device.

An audio device according to an embodiment of the present invention includes: a control unit that transmits a first device name relating a group to which an audio device belongs to in a case where the audio device is set as a master device, the master device serving as a content supply source for another device that belongs to the group, the control unit transmitting a second device name relating to the audio device in a case where the audio device is not set as the master device. The first device name may be a device name for the group. The second device name may be a device name that differs from the device name for the group. The first device name may be a device name for synchronous playback by the group. The second device name may be a device name for playback by the audio device alone. The control unit may play back content by control by a control terminal. The control unit may synchronously play back content with said another device in a case where the audio device has been grouped with said another device by the control terminal. The above audio device may further include: a storage unit that stores the first device name and the second device name. In a case where the audio device is set as the master device by the control terminal, the control unit may receive the first device name from the control terminal and store the received first device name in the storage unit. The control unit may transmit the first device name to another terminal including the control terminal, in a case where the audio device is set as the master device. The control unit may transmit the second device name to said another terminal including the control terminal, in a case where the audio device is not set as the master device.

In a case where content playback is controlled by the control terminal and the audio device has been grouped by the control terminal, the above audio device may synchronously play back same content with said another device that belongs to the same group. The audio device may further include a storage unit that stores the first device name and the second device name. The first device name may be a device name for the group. The second device name may be a device name for a non-group. The control unit may receive a device name for the group from the control terminal and updates the device name for the group in the storage unit, in a case where the audio device is set as the master device by the control terminal. In a case of transmitting a device name to another terminal including the control terminal, the control terminal may transmit the device name for the group in a case where the audio device is set as the master device, and in a case of transmitting a device name to said another terminal including the control terminal, the control terminal may transmit the device name for the non-group in a case where a master device setting is cancelled.

An audio system control program according to an embodiment of the present invention causes a computer of a control terminal to function as: a manipulation unit that receives a manipulation for setting a plurality of audio devices including a first audio device to a same group, the manipulation unit receiving a manipulation for cancelling the setting of the group; and a name setting unit that transmits a setting request to the first audio device in a case where the manipulation unit has received the manipulation for setting the plurality of audio devices to the same group, the setting request being one of a request to change a device name of the first audio device to a first device name relating to the group to which the first audio device belongs, and a request to add the first device name as the device name of the first audio device, the name setting unit transmitting a cancellation request to the first audio device in a case where the manipulation unit has received the manipulation for cancelling the setting of the group, the cancellation request being one of a request to change the device name of the first audio device to a second device name relating to the first audio device, and a request to delete the first device name from the device name of the first audio device. The first device name may be a device name for the group. The second device name may be a device name that differs from the device name for the group. The audio system control program further causes the computer to function as: a control unit that controls playback of content by the plurality of audio devices, groups the plurality of audio devices, and causes the group to synchronously play back same content. The manipulation unit may receive a selection of a master device serving as a supply source of content synchronously played back in the group, and a selection of a client device that receives from the master device the content synchronously played back.

In the audio system control program, the name setting unit may transmit the setting request to the master device, and the name setting unit may transmit the cancellation request to the first audio device selected as the master device prior to cancellation.

In the audio system control program, the first device name may include information specifying number of the client device belonging to a same group as the master device.

In the audio system control program, each of the first device name and the second device name may include a name of an area in which the first audio device is installed. The information specifying the number of the client device may be information specifying number of an area in which the client device is installed.

A control terminal according to an embodiment of the present invention includes: a manipulation unit that receives a manipulation for setting a plurality of audio devices including a first audio device to a same group, the manipulation unit receiving a manipulation for cancelling the setting of the group; and a name setting unit that transmits a setting request to the first audio device in a case where the manipulation unit has received the manipulation for setting the plurality of audio devices to the same group, the setting request being one of a request to change a device name of the first audio device to a first device name relating to the group to which the first audio device belongs, and a request to add the first device name as the device name of the first audio device, the name setting unit transmitting a cancellation request to the first audio device in a case where the manipulation unit has received the manipulation for cancelling the setting of the group, the cancellation request being one of a request to change the device name of the first audio device to a second device name relating to the first audio device, and a request to delete the first device name from the device name of the first audio device. The first device name may be a device name for the group. The second device name may be a device name that differs from the device name for the group. The above control terminal may further include: a control unit that controls playback of content by the plurality of audio devices, groups the plurality of audio devices, and causes the group to synchronously play back same content. The above control terminal may further include: a storage unit that stores information relating to the device name of the first audio device and information relating to a name of the group to which the first audio device belongs.

The above control terminal may further include: a communication unit that is connected with the plurality of audio devices via a network and communicates with the plurality of audio devices. The manipulation unit may receive a selection of a master device serving as a supply source of content synchronously played back in the group, and a selection of a client device that receives from the master device the content synchronously played back. The name setting unit may transmit the setting request to the master device, and the name setting unit may transmit the cancellation request to the first audio device selected as the master device prior to cancellation. The first device name may include information specifying number of the client device belonging to a same group as the master device. Each of the first device name and the second device name may include a name of an area in which the first audio device is installed. The information specifying the number of the client device is information specifying number of an area in which the client device is installed.

The present invention may be applied to an audio device, an audio system control program, a control terminal, a method for an audio device, and a method for a control terminal.

While the embodiments of the invention have been described and illustrated above, the present invention is not limited to the above embodiments. Various modifications can be made without departing from the scope of the present invention.

What is claimed is:

1. An audio device comprising:

at least one processor, and at least one memory configured to store instructions that, when executed by the at least one processor, causes the audio device to:

transmit a first device name relating a group to which the audio device belongs to in a case where the audio device is set as a master device, wherein the master device serves as a content supply source for another device that belongs to the group, and transmit a second device name relating to the audio device in a case where the audio device is not set as the master device.

2. The audio device according to claim 1, wherein the first device name is a device name for the group, and the second device name is a device name that differs from the device name for the group.

3. The audio device according to claim 2, wherein the first device name is a device name for synchronous playback by the group, and the second device name is a device name for playback by the audio device alone.

4. The audio device according to claim 1, wherein the at least one processor further:

plays back content by control by a control terminal, and synchronously plays back content with said another device in a case where the audio device has been grouped with said another device by the control terminal.

5. The audio device according to claim 1, further comprising:

a storage that stores the first device name and the second device name.

6. The audio device according to claim 5, wherein the at least one processor further receives the first device name from the control terminal and stores the received first device name in the storage in a case where the audio device is set as the master device by the control terminal.

7. The audio device according to claim 4, wherein the at least one processor transmits the first device name to another terminal including the control terminal, in a case where the audio device is set as the master device, and the at least one processor transmits the second device name to said another terminal including the control terminal, in a case where the audio device is not set as the master device.

8. The audio device according to claim 1, wherein in a case where content playback is controlled by the control terminal and the audio device has been grouped by the control terminal, the audio device synchronously plays back same content with said another device that belongs to the same group, the audio device further comprises a storage that stores the first device name and the second device name, the first device name is a device name for the group, the second device name is a device name for a non-group, the at least one processor further receives a device name for the group from the control terminal and updates the device name for the group in the storage, in a case where the audio device is set as the master device by the control terminal, and in a case of transmitting a device name to another terminal including the control terminal, the control terminal transmits the device name for the group in a case where the audio device is set as the master device, and in a case of transmitting a device name to said another terminal including the control terminal, the control terminal transmits the device name for the non-group in a case where a master device setting is cancelled.

9. A control terminal comprising:

at least one processor, and at least one memory configured to store instructions that, when executed by the at least one processor, causes the control terminal to:

receive a manipulation for setting a plurality of audio devices including a first audio device to a same group and a manipulation for cancelling the setting of the group, transmit a setting request to the first audio device in a case where the manipulation for setting the plurality of audio devices to the same group has been received, wherein the setting request is one of a request to change a device name of the first audio device to a first device name relating to the group to which the first audio device belongs, and a request to add the first device name as the device name of the first audio device, and transmit a cancellation request to the first audio device in a case where the manipulation for cancelling the setting of the group has been received, wherein the cancellation request is one of a request to change the device name of the first audio device to a second device name relating to the first audio device, and a request to delete the first device name from the device name of the first audio device.

10. The control terminal according to claim 9, wherein the first device name is a device name for the group, and the second device name is a device name that differs from the device name for the group.

11. The control terminal according to claim 9, wherein the at least one processor further controls playback of content by the plurality of audio devices, groups the plurality of audio devices, and causes the group to synchronously play back same content.

12. The control terminal according to claim 9, further comprising:

a storage that stores information relating to the device name of the first audio device and information relating to a name of the group to which the first audio device belongs.

13. The control terminal according to claim 9, further comprising:

a communication device that is connected with the plurality of audio devices via a network and communicates with the plurality of audio devices.

14. The control terminal according to claim 9, wherein the at least one processor further receives a selection of a master device serving as a supply source of content synchronously played back in the group, and a selection of a client device that receives from the master device the content synchronously played back.

15. The control terminal according to claim 14, wherein the at least one processor further transmits the setting request to the master device, and transmits the cancellation request to the first audio device selected as the master device prior to cancellation.

16. The control terminal according to claim 14, wherein the first device name includes information specifying number of the client device belonging to a same group as the master device.

17. The control terminal according to claim 16, wherein each of the first device name and the second device name includes a name of an area in which the first audio device is installed, and the information specifying the number of the client device is information specifying number of an area in which the client device is installed.

18. A method for an audio device, comprising:

transmitting a first device name relating a group to which the audio device belongs to in a case where the audio device is set as a master device, the master device serving as a content supply source for another device that belongs to the group; and transmitting a second device name relating to the audio device in a case where the audio device is not set as the master device.

* * * * *